United States Patent
Crane

(10) Patent No.: US 7,793,509 B2
(45) Date of Patent: Sep. 14, 2010

(54) SYSTEM AND METHOD FOR CAPACITY CONTROL IN A MULTIPLE COMPRESSOR CHILLER SYSTEM

(75) Inventor: Curtis C. Crane, York, PA (US)

(73) Assignee: Johnson Controls Technology Company, Holland, MI (US)

( * ) Notice: Subject to any disclaimer, the term of this patent is extended or adjusted under 35 U.S.C. 154(b) by 965 days.

(21) Appl. No.: 11/556,426

(22) Filed: Nov. 3, 2006

(65) Prior Publication Data

US 2007/0056300 A1 Mar. 15, 2007

Related U.S. Application Data

(63) Continuation-in-part of application No. 10/822,492, filed on Apr. 12, 2004, now Pat. No. 7,207,183.

(60) Provisional application No. 60/733,004, filed on Nov. 3, 2005.

(51) Int. Cl.
- F25B 7/00 (2006.01)
- F25B 1/00 (2006.01)
- F25B 49/00 (2006.01)
- F04B 41/06 (2006.01)

(52) U.S. Cl. .................... 62/175; 62/228.4; 62/228.5; 417/2

(58) Field of Classification Search .......... 62/175, 62/185, 228.4, 228.5, 510; 417/2, 44.1, 45
See application file for complete search history.

(56) References Cited

U.S. PATENT DOCUMENTS

| | | |
|---|---|---|
| 2,442,021 A | 5/1948 | Rose |
| 3,390,320 A | 6/1968 | Kammiller et al. |
| 3,621,365 A | 11/1971 | Beck et al. |
| 3,909,687 A | 9/1975 | Abbondanti |
| 4,150,425 A | 4/1979 | Nagano et al. |
| 4,151,725 A | 5/1979 | Kountz et al. |
| 4,152,902 A | 5/1979 | Lush |
| 4,210,957 A | 7/1980 | Spethmann |
| 4,384,462 A | 5/1983 | Overman et al. |
| 4,483,152 A | 11/1984 | Bitondo |
| 4,487,028 A | 12/1984 | Foye |
| 4,502,842 A | 3/1985 | Currier et al. |
| 4,546,423 A | 10/1985 | Seki |

(Continued)

FOREIGN PATENT DOCUMENTS

DE  3832037 A1  3/1990

(Continued)

*Primary Examiner*—Marc E Norman
(74) *Attorney, Agent, or Firm*—McNees Wallace & Nurick, LLC

(57) ABSTRACT

A capacity control algorithm for a multiple compressor liquid chiller system is provided wherein the speed and number of compressors in operation are controlled in order to obtain a leaving liquid temperature setpoint. In response to an increase in the load in the chiller system, the algorithm determines if a compressor should be started and adjusts the operating speed of all operating compressors when an additional compressor is started. In response to a decrease in the load in the chiller system with multiple compressors operating, the algorithm determines if a compressor should be de-energized and adjusts the operating speed of all remaining operating compressors when a compressor is de-energized.

27 Claims, 13 Drawing Sheets

U.S. PATENT DOCUMENTS

| | | | |
|---|---|---|---|
| 4,562,531 A | 12/1985 | Enterlinen et al. |
| 4,614,089 A | 9/1986 | Dorsey |
| 4,633,672 A | 1/1987 | Persem et al. |
| 4,679,404 A | 7/1987 | Alsenz |
| 4,787,211 A | 11/1988 | Shaw |
| 4,876,859 A | 10/1989 | Kitamoto et al. |
| 4,877,388 A | 10/1989 | Inada et al. |
| 4,947,655 A | 8/1990 | Shaw |
| 4,958,118 A | 9/1990 | Pottebaum |
| 5,010,287 A | 4/1991 | Mukai et al. |
| 5,123,256 A | 6/1992 | Oltman |
| 5,131,237 A | 7/1992 | Valbjorn |
| 5,231,846 A | 8/1993 | Goshaw et al. |
| 5,235,504 A | 8/1993 | Sood |
| 5,343,384 A | 8/1994 | Fisher et al. |
| 5,350,992 A | 9/1994 | Colter |
| 5,446,645 A | 8/1995 | Shirahama et al. |
| 5,488,279 A | 1/1996 | Kawamoto et al. |
| 5,492,273 A | 2/1996 | Shah |
| 5,503,248 A | 4/1996 | Peruggi et al. |
| 5,509,504 A | 4/1996 | McHugh et al. |
| 5,528,114 A | 6/1996 | Tokizaki et al. |
| 5,586,444 A | 12/1996 | Fung |
| 5,632,156 A | 5/1997 | Takeo et al. |
| 5,669,225 A | 9/1997 | Beaverson et al. |
| 5,735,134 A | 4/1998 | Liu et al. |
| 5,797,729 A | 8/1998 | Rafuse, Jr. et al. |
| 5,845,509 A | 12/1998 | Shaw et al. |
| 5,894,736 A | 4/1999 | Beaverson et al. |
| 5,896,021 A | 4/1999 | Kumar |
| 6,008,616 A | 12/1999 | Nagayama et al. |
| 6,018,957 A | 2/2000 | Katra et al. |
| 6,031,738 A | 2/2000 | Lipo et al. |
| 6,035,651 A | 3/2000 | Carey |
| 6,124,697 A | 9/2000 | Wilkerson |
| 6,185,946 B1 | 2/2001 | Hartman |
| 6,229,722 B1 | 5/2001 | Ichikawa et al. |
| 6,233,954 B1 | 5/2001 | Mehaffey et al. |
| 6,325,142 B1 | 12/2001 | Bosley et al. |
| 6,370,888 B1 | 4/2002 | Grabon |
| 6,408,645 B1 | 6/2002 | Tsuboe et al. |
| 6,434,960 B1 | 8/2002 | Rousseau |
| 6,459,596 B1 | 10/2002 | Corzine |
| 6,459,606 B1 | 10/2002 | Jadric |
| 6,463,748 B1 | 10/2002 | Benedict et al. |
| 6,499,504 B2 | 12/2002 | Wichert |
| 6,516,622 B1 | 2/2003 | Wilson et al. |
| 6,540,148 B1 | 4/2003 | Salsbury et al. |
| 6,579,067 B1 | 6/2003 | Holden |
| 6,659,726 B2 | 12/2003 | Holden |
| 7,628,028 B2 * | 12/2009 | Tolbert et al. ............... 62/228.4 |
| 2003/0037555 A1 | 2/2003 | Street et al. |
| 2003/0041605 A1 | 3/2003 | Butcher et al. |
| 2003/0233837 A1 | 12/2003 | Lee et al. |
| 2004/0000155 A1 | 1/2004 | Cline et al. |
| 2005/0091998 A1 * | 5/2005 | Cho et al. ..................... 62/175 |
| 2005/0223724 A1 | 10/2005 | Crane et al. |
| 2006/0225445 A1 * | 10/2006 | Lifson et al. .................. 62/175 |

FOREIGN PATENT DOCUMENTS

| | | |
|---|---|---|
| EP | 0521551 A1 | 1/1993 |
| EP | 0543622 A2 | 5/1993 |
| EP | 1271067 A | 1/2003 |
| EP | 1376842 A1 | 1/2004 |
| EP | 1398576 A | 3/2004 |
| EP | 1482257 A | 12/2004 |
| GB | 2241091 A | 8/1991 |
| GB | 2257243 A | 1/1993 |
| JP | 10019395 | 1/1989 |
| JP | 03294738 A | 12/1991 |
| JP | 2000184787 A | 6/2000 |
| JP | 2002181370 | 6/2002 |
| KR | 10-0576678 | 5/2006 |
| WO | 95/06973 | 3/1995 |
| WO | 96/28700 A | 9/1996 |
| WO | 97/50022 | 12/1997 |
| WO | 00/41288 | 7/2000 |
| WO | 03036189 | 1/2003 |
| WO | 03073025 A1 | 9/2003 |
| WO | 2005/047700 A | 5/2005 |
| WO | 2005/100884 A | 10/2005 |
| WO | 2005/100885 A | 10/2005 |

* cited by examiner

SYSTEM AND METHOD FOR CAPACITY CONTROL IN A MULTIPLE COMPRESSOR CHILLER SYSTEM

CROSS REFERENCE TO RELATED APPLICATIONS

This application claims the benefit of U.S. Provisional Application No. 60/733,004 filed Nov. 3, 2005 and is a continuation-in-part of application Ser. No. 10/822,492, filed on Apr. 12, 2004.

BACKGROUND OF THE INVENTION

The present invention relates generally to controlling the capacity of a chiller system. More specifically, the present invention relates to controlling the capacity of a multiple compressor chiller system during high ambient air temperature conditions.

Many liquid chiller or refrigeration applications use multiple compressors, i.e., two or more compressors, in one or more corresponding refrigerant circuits. One purpose for the use of multiple compressors is to obtain an increased capacity from the chiller system, which increased capacity could not be obtained by operating a single compressor. In addition, the use of multiple compressors can provide for improved reliability of the overall system by having one or more compressors remain operational to provide a reduced level of cooling capacity in the event that a compressor fails and can no longer provide cooling capacity.

The compressor motors of the chiller system can be powered directly from the AC power grid at the system location, which would result in the compressor being operated at only a single speed. Alternatively, the compressor motor(s) can use a variable speed drive inserted between the system power grid and the motor to provide the motor with power at a variable frequency and variable voltage, which then results in the compressor being capable of operation at several different speeds. Variable speed operation of the motors can be obtained by providing a corresponding variable speed drive for each compressor motor or by connecting all of the compressor motors in parallel to the inverter output of a variable speed drive. One drawback of using a separate variable speed drive for each compressor is that the overall chiller system becomes more expensive because multiple drives with a given cumulative power rating are more expensive than a single drive of the same output power rating. A drawback to connecting the compressor motors in parallel to the single inverter output of the variable speed drive is that a fault or failure of one of the motors may disable the variable speed drive and thus prevent the other motors connected to the variable speed drive from operating the remaining compressors on the chiller system. This disabling of the other motors connected to the variable speed drive defeats the function of the redundant compressors because all the compressors are disabled as a result of the disabling of the motors and the variable speed drive.

The corresponding control for the compressor motor powered by the AC power grid is relatively simple, involving mainly the starting and stopping of the motor. The corresponding control for the variable speed drive powered compressor motor is much more complicated and involves determining an appropriate speed for each compressor motor (and compressor) based on system conditions.

One type of control for multiple compressors involves sequential engaging and disengaging of compressors to obtain a desired system load. This control process usually involves the starting of one compressor to meet an increasing system demand and subsequently adding additional compressors until the system demand is satisfied. The compressors are then shutdown or unloaded in a similar manner in response to a decreasing system demand. One example of this type of control is found in U.S. Pat. No. 6,499,504 (the '504 Patent). The '504 Patent is directed to a compressor control system that operates in response to both the system pressure and the volumetric flow rate capacity of the system. Specifically, a compressor is loaded or unloaded from the compressor system after sensing the actual pressure and volumetric flow rate capacity of the compressor system.

Another type of control process for multiple compressors involves determining an operating configuration for a lead compressor based on system conditions and then controlling one or more lag compressors using additional control instructions to match the output of the lead compressor. One example of this type of control is found in U.S. Pat. No. 5,343,384 (the '384 Patent). The '384 Patent is directed to a control system and method that operates a plurality of compressors at similar operating points. A microcontroller continually compares the system pressure with the desired pressure and causes corresponding adjustments, either up or down, in first, the position of the inlet valve of a lead compressor, and subsequently, in the position of the bypass valve of a lead compressor, so that these changes can be passed to the remaining compressors in the system by way of the CEM program.

Therefore, what is needed is a system and method for controlling the capacity of a multiple compressor chiller system by controlling both the operating speed of the compressors and the number of compressors in operation to maintain a leaving chilled liquid temperature setpoint in the chiller system.

SUMMARY OF THE INVENTION

One embodiment of the present invention is directed to a method for controlling the capacity of a multiple compressor chiller system. The method includes the step of providing a variable speed drive having a plurality of inverters. Each inverter is configured to power a corresponding compressor motor of a multiple compressor chiller system. The method also includes the steps of monitoring at least one operating condition of a multiple compressor chiller system, determining whether to increase output capacity of a multiple compressor chiller system in response to the at least one monitored operating condition, and adjusting an operating configuration of the plurality of inverters to increase the output capacity of a multiple compressor chiller system in response to a determination to increase output capacity. The method further includes the steps of determining whether to decrease output capacity of a multiple compressor chiller system in response to the at least one monitored operating condition and adjusting an operating configuration of the plurality of inverters to decrease the output capacity of a multiple compressor chiller system in response to a determination to decrease output capacity.

Another embodiment of the present invention is directed to a multiple compressor chiller system having a plurality of compressors. Each compressor of the plurality of compressors being driven by a corresponding motor and the plurality of compressors are incorporated into at least one refrigerant circuit. Each refrigerant circuit includes at least one compressor of the plurality of compressors, a condenser arrangement and an evaporator arrangement connected in a closed refrigerant loop. The multiple compressor chiller system also has a variable speed drive to power the corresponding motors of the plurality of compressors. The variable speed drive includes a converter stage, a DC link stage and an inverter stage. The inverter stage having a plurality of inverters each electrically connected in parallel to the DC link stage and each powering a corresponding motor of the plurality of compressors. The multiple compressor chiller system further has a control panel to control the variable speed drive to generate a preselected system capacity from the plurality of compressors. The control panel is configured to determine a number of inverters of the plurality of inverters to operate in the variable speed drive and is configured to determine an operating frequency for the number of operating inverters of the plurality of inverters in the variable speed drive to generate the preselected system capacity from the plurality of compressors.

A further embodiment of the present invention is directed to a capacity control method for a multiple compressor chiller system. The method includes the step of providing a variable speed drive having a plurality of inverters. Each inverter is configured to power a corresponding compressor motor of a multiple compressor chiller system at a preselected output frequency. The method also includes the steps of monitoring at least one operating condition of a multiple compressor chiller system, determining whether to increase capacity in the multiple compressor chiller system in response to the at least one monitored operating condition, and configuring the plurality of inverters to generate increased capacity in the multiple compressor chiller system in response to a determination to increase capacity. The step of configuring the plurality of inverters to generate increased capacity includes determining whether to enable an additional inverter of the plurality of inverters in order to start an additional compressor motor of the multiple compressor chiller system, enabling an additional inverter of the plurality of inverters in response to a determination to enable an additional inverter, and adjusting the preselected output frequency of each operating inverter of the plurality of inverters. The method further includes the steps of determining whether to decrease capacity in the multiple compressor chiller system in response to the at least one monitored operating condition and configuring the plurality of inverters to generate decreased capacity in the multiple compressor chiller system in response to a determination to decrease capacity. The step of configuring the plurality of inverters to generate decreased capacity includes determining whether to disable an operating inverter of the plurality of inverters in order to stop a compressor motor of the multiple compressor chiller system, disabling an operating inverter of the plurality of inverters in response to a determination to disable an operating inverter, and decreasing the preselected output frequency of each operating inverter of the plurality of inverters.

Still another embodiment of the present invention is directed to a method for controlling the capacity of a chiller system having a plurality of compressors. The method includes the steps of providing a variable speed drive having a plurality of inverters. Each inverter is configured to power a corresponding motor of the plurality of compressors. The method also includes measuring the ambient air temperature, controlling the variable speed drive with a capacity control program in response to the ambient air temperature being less than a first predetermined temperature, and controlling the variable speed drive with a high ambient air temperature capacity control program in response to the ambient air temperature being greater than a second predetermined temperature. The high ambient air temperature capacity control program being configured to override the capacity control program and provide improved control of the chiller system at high ambient air temperature conditions.

Yet another embodiment of the present invention is directed to a multiple compressor chiller system. The chiller system includes a plurality of compressors, a variable speed drive to power the corresponding motors of the plurality of compressors, and a control panel to control the variable speed drive to generate a preselected system capacity from the plurality of compressors. Each compressor of the plurality of compressors being driven by a corresponding motor, the plurality of compressors is incorporated into at least one refrigerant circuit. Each refrigerant circuit has at least one compressor of the plurality of compressors, a condenser arrangement and an evaporator arrangement connected in a closed refrigerant loop. The variable speed drive includes a converter stage, a DC link stage and an inverter stage. The inverter stage has a plurality of inverters each electrically connected in parallel to the DC link stage and each powering a corresponding motor of the plurality of compressors. The control panel is configured to control the variable speed drive with a capacity control program in response to an ambient air temperature being less than a first predetermined temperature and to control the variable speed drive with a high ambient air temperature capacity control program in response to the ambient air temperature being greater than a second predetermined temperature. The high ambient air temperature capacity control program is configured to provide improved control of the chiller system at high ambient air temperature conditions.

One advantage of the present invention is that compressor cycling is reduced, while providing optimum control of the compressors.

Another advantage of the present invention is that system efficiency is improved by operating as many compressors as possible to satisfy a given load condition.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

Wherever possible, the same reference numbers will be used throughout the drawings to refer to the same or like parts.

DETAILED DESCRIPTION OF THE INVENTION

Figure 1:
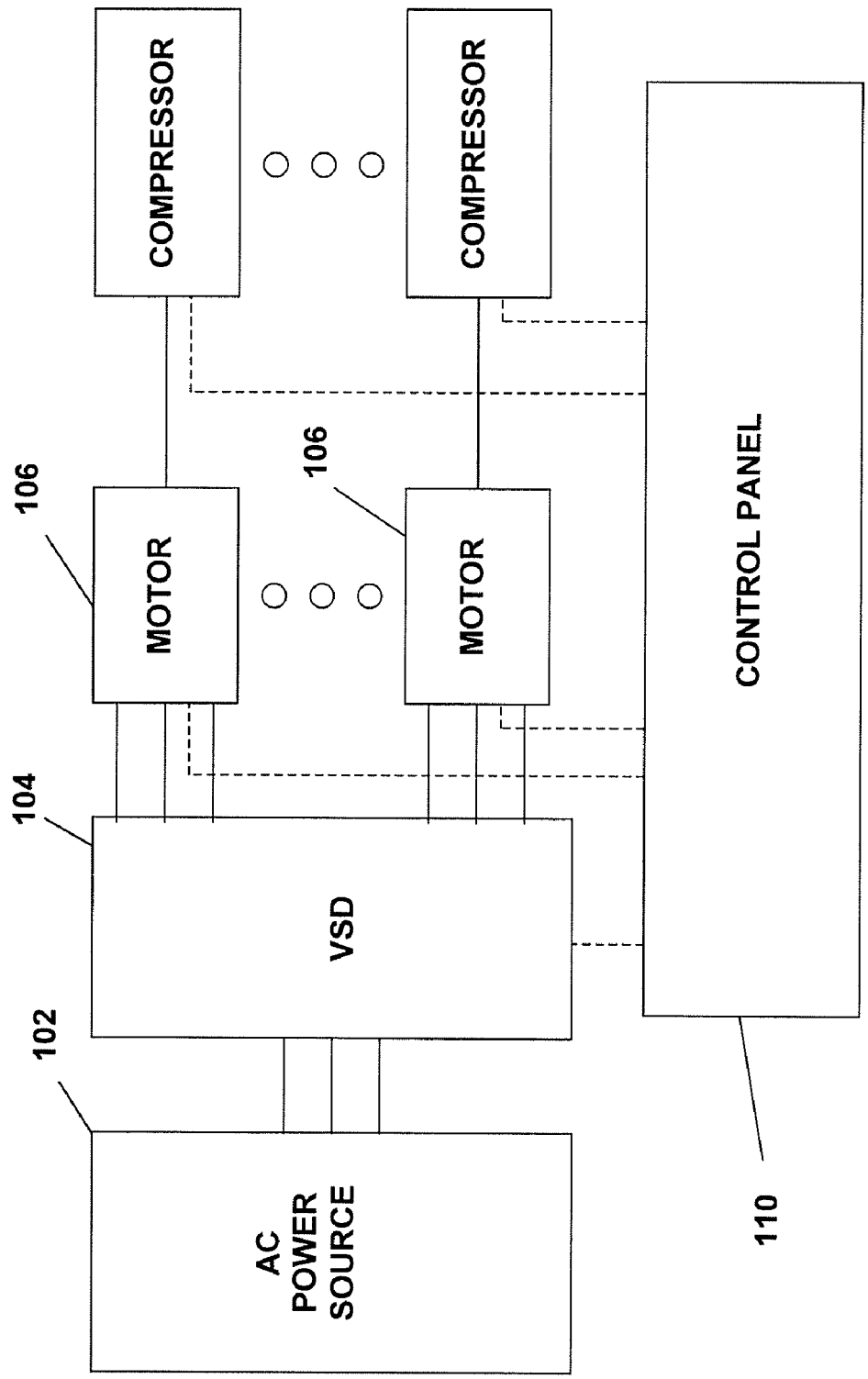
FIG. 1 illustrates a general application that can be used with the present invention.

FIG. 1 illustrates generally an application that can be used with the present invention. An AC power source 102 supplies a variable speed drive (VSD) 104, which powers a plurality of motors 106. The motors 106 are preferably used to drive corresponding compressors that can be used in a refrigeration or chiller system. A control panel 110 can be used to control operation of the VSD 104 and can monitor and/or control operation of the motors 106 and compressors.

The AC power source 102 provides single phase or multi-phase (e.g., three phase), fixed voltage, and fixed frequency AC power to the VSD 104 from an AC power grid or distribution system that is present at a site. The AC power source 102 preferably can supply an AC voltage or line voltage of 200 V, 230 V, 380 V, 460 V, or 600 V at a line frequency of 50 Hz or 60 Hz, to the VSD 104 depending on the corresponding AC power grid.

The VSD 104 receives AC power having a particular fixed line voltage and fixed line frequency from the AC power source 102 and provides AC power to each of the motors 106 at desired voltages and desired frequencies, both of which can be varied to satisfy particular requirements. Preferably, the VSD 104 can provide AC power to each of the motors 106 that may have higher voltages and frequencies and lower voltages and frequencies than the rated voltage and frequency of each motor 106. In another embodiment, the VSD 104 may again provide higher and lower frequencies but only the same or lower voltages than the rated voltage and frequency of each motor 106.

The motors 106 are preferably induction motors that are capable of being operated at variable speeds. The induction motors can have any suitable pole arrangement including two poles, four poles or six poles. However, any suitable motor that can be operated at variable speeds can be used with the present invention.

Figure 2:
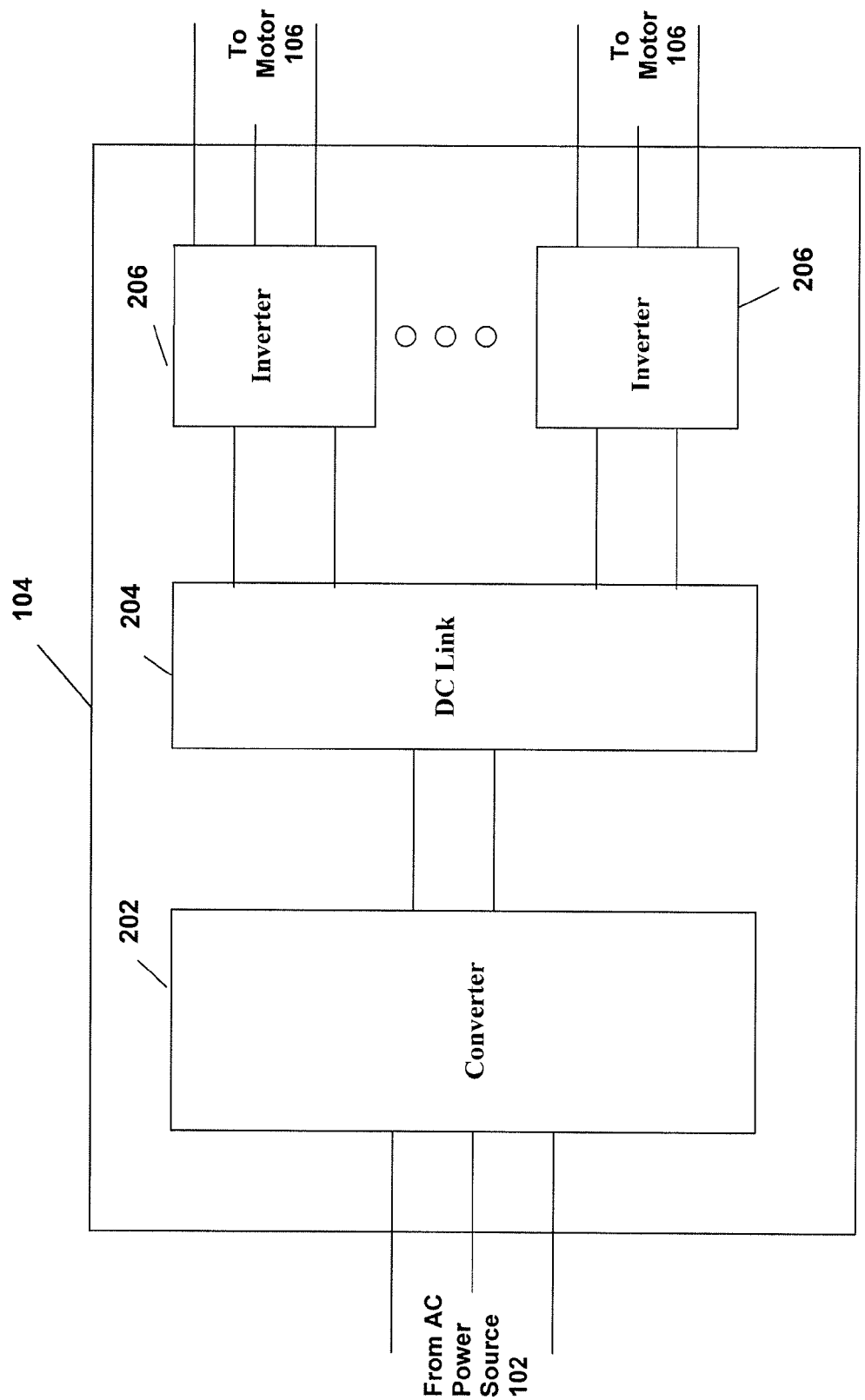
FIG. 2 illustrates schematically a variable speed drive that can be used with the present invention.

FIG. 2 illustrates schematically some of the components in one embodiment of the VSD 104. The VSD 104 can have three stages: a converter or rectifier stage 202, a DC link stage 204 and an output stage having a plurality of inverters 206. The converter 202 converts the fixed line frequency, fixed line voltage AC power from the AC power source 102 into DC power. The converter 202 can be in a rectifier arrangement composed of electronic switches that can only be turned on either by gating, when using silicon controlled rectifiers, or by being forward biased, when using diodes. Alternatively, the converter 202 can be in a converter arrangement composed of electronic switches that can be gated both on and off, to generate a controlled DC voltage and to shape the input current signal to appear sinusoidal, if so desired. The converter arrangement of converter 202 has an additional level of flexibility over the rectifier arrangement, in that the AC power cannot only be rectified to DC power, but that the DC power level can also be controlled to a specific value. In one embodiment of the present invention, the diodes and silicon controlled rectifiers (SCRs) can provide the converter 202 with a large current surge capability and a low failure rate. In another embodiment, the converter 202 can utilize a diode or thyristor rectifier coupled to a boost DC/DC converter or a pulse width modulated boost rectifier to provide a boosted DC voltage to the DC link 204 in order to obtain an output voltage from the VSD 104 greater than the input voltage of the VSD 104.

The DC link 204 filters the DC power from the converter 202 and provides energy storage components. The DC link 204 can be composed of capacitors and inductors, which are passive devices that exhibit high reliability rates and very low failure rates. Finally, the inverters 206 are connected in parallel on the DC link 204 and each inverter 206 converts the DC power from the DC link 204 into a variable frequency, variable voltage AC power for a corresponding motor 106. The inverters 206 are power modules that can include power transistors or integrated bipolar power transistor (IGBT) power switches with diodes connected in parallel. Furthermore, it is to be understood that the VSD 104 can incorporate different components from those discussed above and shown in FIG. 2 so long as the inverters 206 of the VSD 104 can provide the motors 106 with appropriate output voltages and frequencies.

For each motor 106 to be powered by the VSD 104, there is a corresponding inverter 206 in the output stage of the VSD 104. The number of motors 106 that can be powered by the VSD 104 is dependent upon the number of inverters 206 that are incorporated into the VSD 104. In a preferred embodiment, there can be either 2 or 3 inverters 206 incorporated in the VSD 104 that are connected in parallel to the DC link 204 and used for powering a corresponding motor 106. While it is preferred for the VSD 104 to have between 2 and 3 inverters 206, it is to be understood that more than 3 inverters 206 can be used so long as the DC link 204 can provide and maintain the appropriate DC voltage to each of the inverters 206.

In a preferred embodiment, the inverters 206 are jointly controlled by a control system, as discussed in greater detail below, such that each inverter 206 provides AC power at the same desired voltage and frequency to corresponding motors based on a common control signal or control instruction provided to the inverters 206. The control of the inverters 206 can be by the control panel 110 or other suitable control device that incorporates the control system.

The VSD 104 can prevent large inrush currents from reaching the motors 106 during the startup of the motors 106. In addition, the inverters 206 of the VSD 104 can provide the AC power source 102 with power having about a unity power factor. Finally, the ability of the VSD 104 to adjust both the input voltage and input frequency received by the motor 106 permits a system equipped with VSD 104 to be operated on a variety of foreign and domestic power grids without having to alter the motors 106 for different power sources.

Figure 3:
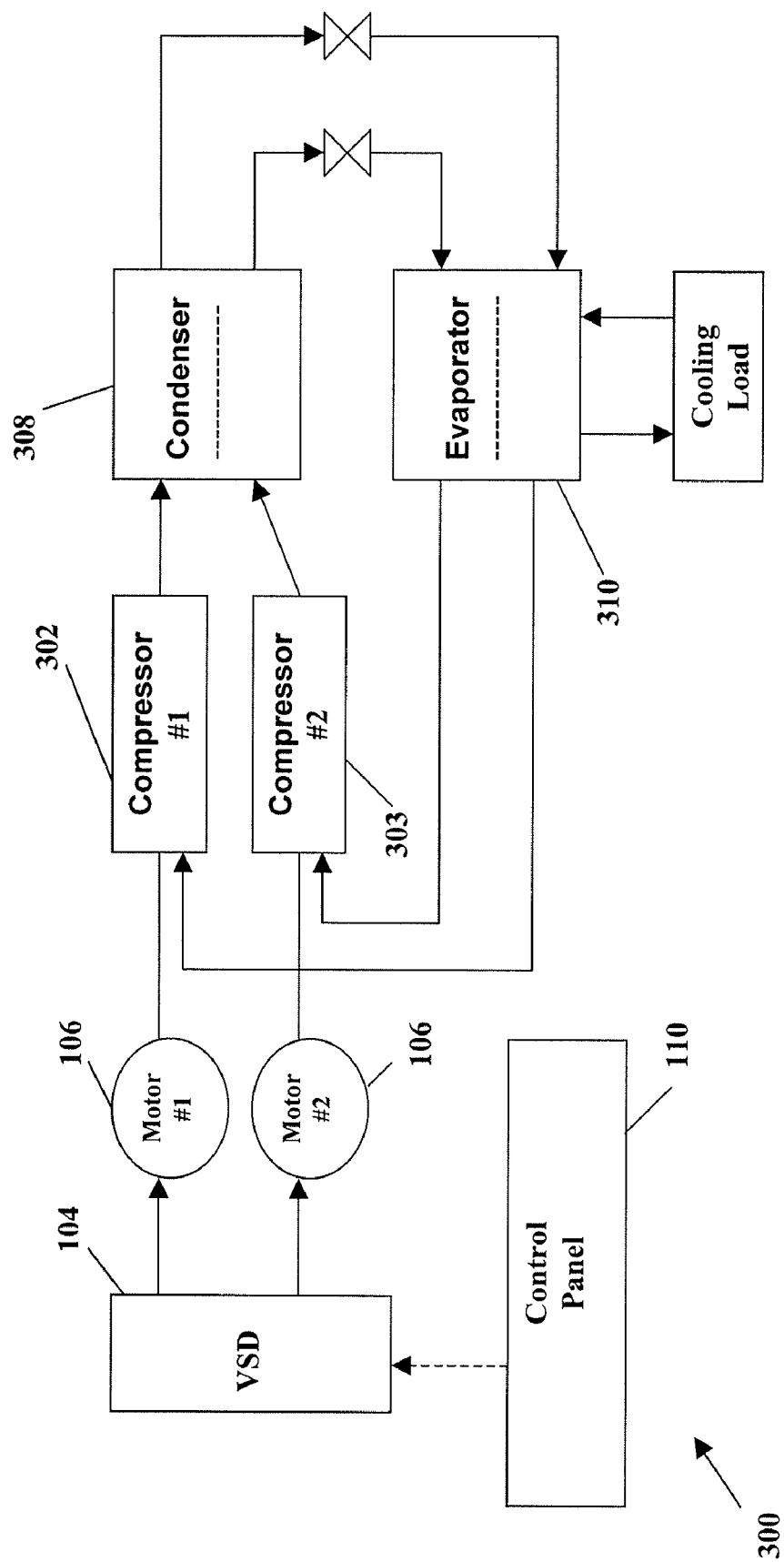
FIG. 3 illustrates an embodiment of a refrigeration or chiller system used with the present invention.

FIG. 3 illustrates generally one embodiment of the present invention incorporated in a refrigeration system. As shown in FIG. 3, the HVAC, refrigeration or liquid chiller system 300 has two compressors incorporated in corresponding refrigerant circuits, but it is to be understood that the system 300 can have one refrigerant circuit or more than two refrigerant circuits for providing the desired system load and can have more than a one compressor for a corresponding refrigerant circuit. The system 300 includes a first compressor 302, a second compressor 303, a condenser arrangement 308, expansion devices, a water chiller or evaporator arrangement 310 and the control panel 110. The control panel 110 can include an analog to digital (A/D) converter, a microprocessor, a non-volatile memory, and an interface board to control operation of the refrigeration system 300. The control panel 110 can also be used to control the operation of the VSD 104, the motors 106 and the compressors 302 and 303. A conventional HVAC, refrigeration or liquid chiller system 300 includes many other features that are not shown in FIG. 3. These features have been purposely omitted to simplify the drawing for ease of illustration.

The compressors 302 and 303 compress a refrigerant vapor and deliver it to the condenser 308. The compressors 302 and 303 are preferably connected in separate refrigeration circuits, i.e., the refrigerant output by the compressors 302 and 303 are not mixed and travel in separate circuits through the system 300 before reentering the compressors 302 and 303 to begin another cycle. The separate refrigeration circuits preferably use a single condenser housing 308 and a single evaporator housing 310 for the corresponding heat exchanges. The condenser housing 308 and evaporator housing 310 maintain the separate refrigerant circuits either through a partition or other dividing means within the corresponding housing or with separate coil arrangements. In another embodiment of the present invention, the refrigerant output by the compressors 302 and 303 can be combined into a single refrigerant circuit to travel through the system 300 before being separated to reenter the compressors 302 and 303.

The compressors 302 and 303 are preferably screw compressors or centrifugal compressors, however the compressors can be any suitable type of compressor including reciprocating compressors, scroll compressors, rotary compressors or other type of compressor. The output capacity of the compressors 302 and 303 can be based on the operating speed of the compressors 302 and 303, which operating speed is dependent on the output speed of the motors 106 driven by the inverters 206 of the VSD 104. The refrigerant vapor delivered to the condenser 308 enters into a heat exchange relationship with a fluid, e.g., air or water, and undergoes a phase change to a refrigerant liquid as a result of the heat exchange relationship with the fluid. The condensed liquid refrigerant from condenser 308 flows through corresponding expansion devices to an evaporator 310.

The evaporator 310 can include connections for a supply line and a return line of a cooling load. A secondary liquid, which is preferably water, but can be any other suitable secondary liquid, e.g. ethylene glycol, calcium chloride brine or sodium chloride brine, travels into the evaporator 310 via return line and exits the evaporator 310 via supply line. The liquid refrigerant in the evaporator 310 enters into a heat exchange relationship with the secondary liquid to chill the temperature of the secondary liquid. The refrigerant liquid in the evaporator 310 undergoes a phase change to a refrigerant vapor as a result of the heat exchange relationship with the secondary liquid. The vapor refrigerant in the evaporator 310 then returns to the compressors 302 and 303 to complete the cycle. It is to be understood that any suitable configuration of condenser 308 and evaporator 310 can be used in the system 300, provided that the appropriate phase change of the refrigerant in the condenser 304 and evaporator 306 is obtained.

Preferably, the control panel, microprocessor or controller 110 can provide control signals to the VSD 104 to control the operation of the VSD 104, and particularly the operation of inverters 206, to provide the optimal operational setting for the VSD 104. The control panel 110 can increase or decrease the output voltage and/or frequency of the inverters 206 of the VSD 104, as discussed in detail below, in response to increasing or decreasing load conditions on the compressors 302 and 303 in order to obtain a desired operating speed of the motors 106 and a desired capacity of the compressors 302 and 303.

The control panel 110 executes a control algorithm(s) or software to control operation of the system 100 and to determine and implement an operating configuration for the inverters 206 of the VSD 104 to control the capacity of the compressors 102 and 104 in response to a particular output capacity requirement for the system 100. In one embodiment, the control algorithm(s) can be computer programs or software stored in the non-volatile memory of the control panel 110 and can include a series of instructions executable by the microprocessor of the control panel 110. While it is preferred that the control algorithm be embodied in a computer program(s) and executed by the microprocessor, it is to be understood that the control algorithm may be implemented and executed using digital and/or analog hardware by those skilled in the art. If hardware is used to execute the control algorithm, the corresponding configuration of the control panel 110 can be changed to incorporate the necessary components and to remove any components that may no longer be required.

Figure 4:
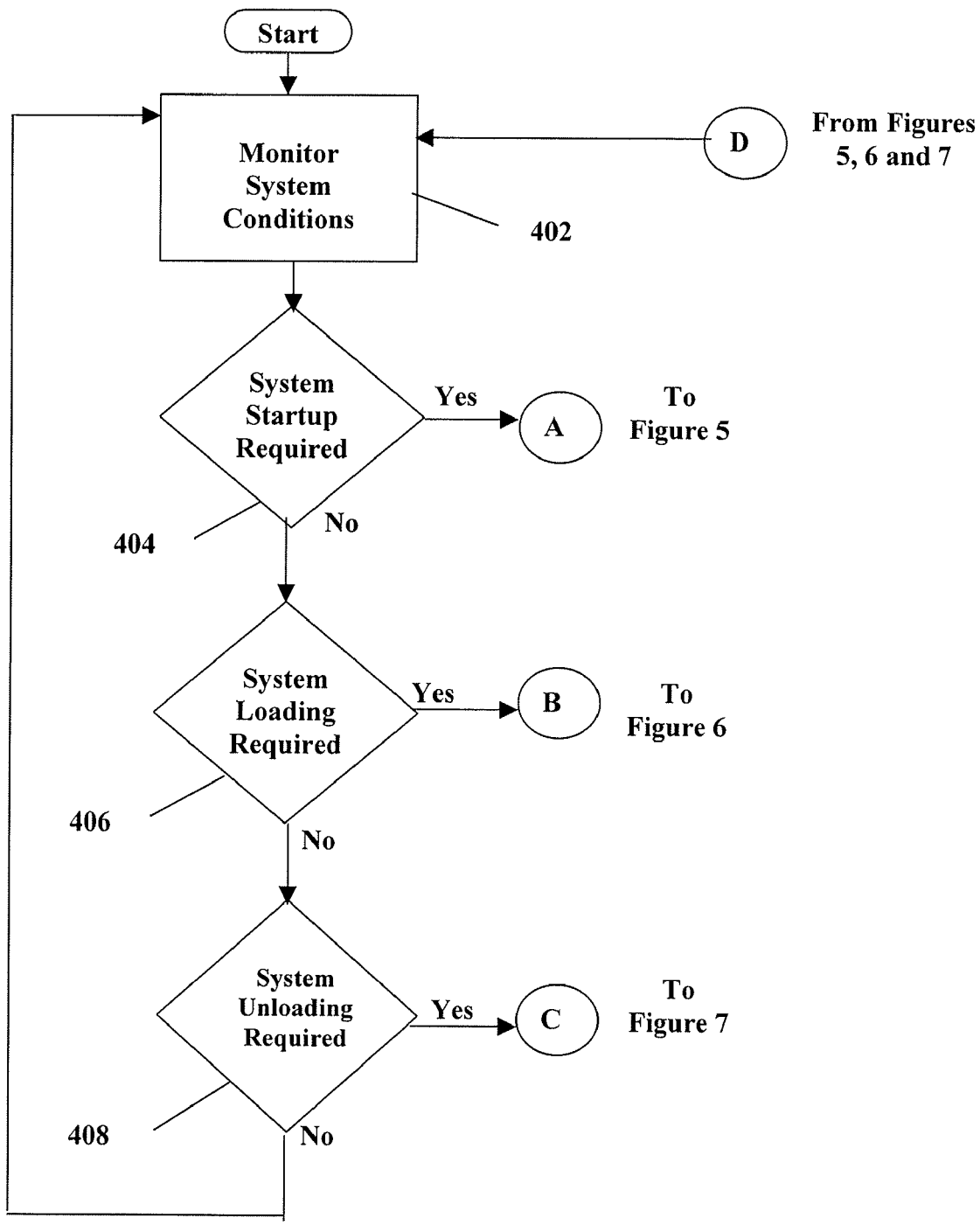
FIG. 4 is a flowchart showing the basic capacity control process of the present invention.

FIG. 4 illustrates the basic capacity control process of the present invention. The process begins by monitoring the current operating conditions of the compressors and the corresponding chiller system at step 402. One or more sensors or other suitable monitoring devices are placed in the chiller system to monitor one or more operating conditions of the chiller system. The sensors provide signals to the control panel 110 corresponding to the measured system parameters. The measured system parameters of the chiller system can correspond to any suitable chiller system parameter that can be measured such as refrigerant temperature, refrigerant pressure, refrigerant flow, leaving chilled liquid temperature from the evaporator or any other suitable parameter.

Based on the monitored system conditions obtained in step 402, the control process then determines if an initial system startup is required in step 404. An initial system startup involves the starting of one or more compressors to transition the system from an inactive or shut-down state to an active or operational state. If an initial system startup is determined to be necessary, the control passes to a startup control process shown in FIG. 5 and described in greater detail below. If no initial system startup is necessary, usually because one or more compressors have been previously started, the control process moves to step 406 to determine if system loading or increased system capacity is required.

If the control process determines that system loading is required in response to a demand for additional system capacity based on the monitored system conditions in step 402, the control process proceeds to a system loading process shown in FIG. 6 and described in greater detail below to increase the load on the compressors in order to increase the system capacity. If system loading is not necessary, the control process moves to step 408 to determine if system unloading or decreased system capacity is required.

If the control process determines that system unloading is required in response to a decrease in the demand for system capacity based on the monitored system conditions in step 402, the control process proceeds to a system unloading process shown in FIG. 7 and described in greater detail below to decrease the load on the compressors in order to decrease the system capacity. If system unloading is not necessary, the control process returns to step 402 and repeats the process.

The basic control process of FIG. 4 preferably uses a fuzzy logic control technique, but can use any suitable control technique for determining when to start the compressors of the chiller system, when to increase the capacity of the chiller system and when to decrease the capacity of the chiller system. The control processes of FIGS. 5, 6 and 7 are preferably directed to the control process for the chiller system in response to one of the above-determinations being made by the basic control process of FIG. 4.

Figure 5:
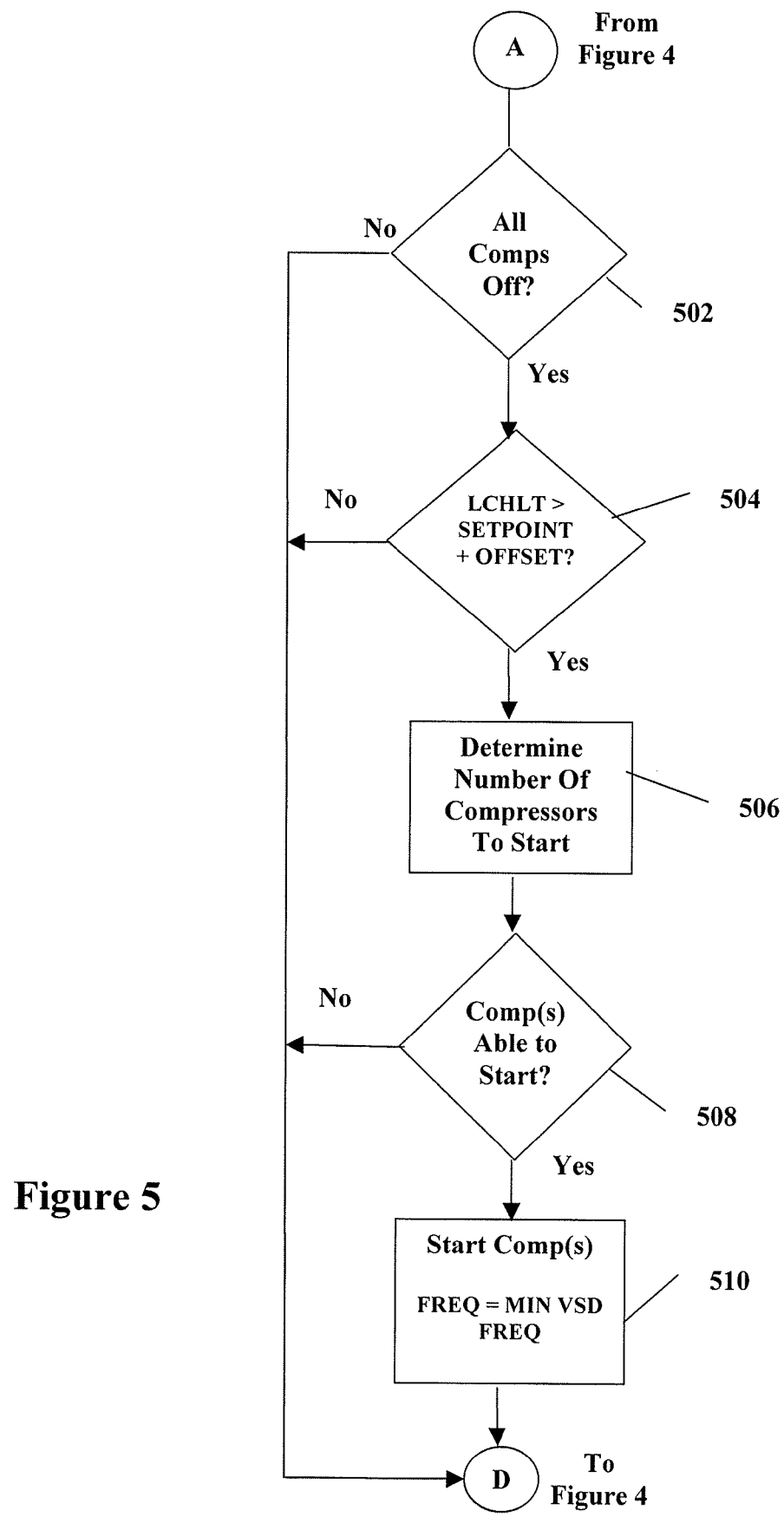
FIG. 5 is a flowchart showing a compressor starting control process of the present invention.

FIG. 5 illustrates a startup control process for the present invention. The startup control process involves the starting of one or more compressors to transition the system from an inactive or shut-down state to an active or operational state. The process begins in step 502 by determining if all of the compressors are off, inactive or shut-down. If one of the compressors is active or operational in step 502, the process returns to step 402 of FIG. 4 to further monitor system conditions because the startup process is not required because one or more of the compressors is operational. Next, after determining that all the compressors are inactive or off in step 502, i.e., the compressors are not in operation, the startup control process determines if the leaving chilled liquid temperature (LCHLT) from the evaporator is greater than a setpoint temperature plus a predetermined offset or control range. The predetermined offset provides for a control region around the setpoint temperature, i.e., the desired LCHLT, to prevent frequent adjustments to the chiller system in response to very minor changes in system conditions.

The predetermined setpoint temperature and the predetermined offset can preferably be programmable or set by a user, but, it is to be understood that the predetermined setpoint temperature and the predetermined offset can also be preprogrammed into the system. The predetermined setpoint temperature can range between about 10° F. and about 60° F. depending on the particular liquid to be chilled in the evaporator. The predetermined setpoint temperature is preferably between about 40° F. and about 55° F. when water is to be chilled and is preferably between about 15° F. and about 55° F. when a glycol mixture is to be chilled. The predetermined offset can range between about ±1° F. and about ±5° F. and is preferably between about ±1.5° F. and about ±2.5° F.

If the LCHLT is greater than the setpoint temperature plus the predetermined offset in step 504, then the number of compressors to be started is determined in step 506. The number of compressors to start can be determined by any suitable technique and is usually determined in response to particular system features or parameters such as the LCHLT and the rate of change of the LCHLT. If the LCHLT is not greater than the setpoint temperature plus the predetermined offset in step 504, then the process returns to step 402 of FIG. 4 to further monitor system conditions. After the number of compressors to start is determined, the compressors are tested in step 508 to determine if the compressors can be started or operated. In step 508, the control panel 110 can preferably determine if the compressors cannot be started or operated or are otherwise inoperable based on internal compressor controls or signals that prevent the starting of a compressor, (e.g., a "no run permissive" signal is present, the compressor has been faulted or the compressor is locked out), or based on other system controls or signals relating to problems or restrictions in the system, (e.g., the system switch has been turned off, the system has been faulted, the system has been locked out, or the system anti-recycle timer is active). If all the compressors cannot be started in step 508, the process returns to step 402 of FIG. 4 to further monitor system conditions. Once it is determined that all the compressors to be started are capable of being started and operated, the compressors are started in step 510 and operated at a frequency corresponding to the minimum frequency output by the VSD. The minimum frequency output by the VSD for compressor operation can range from 15 Hz to 75 Hz and is preferably 40 Hz. It is to be understood that the VSD may be capable of providing a minimum frequency output that is less than the minimum frequency output required for compressor operation. After the compressors are started in step 510, the process returns to step 402 of FIG. 4 to begin the process again and monitor system conditions.

Figure 6:
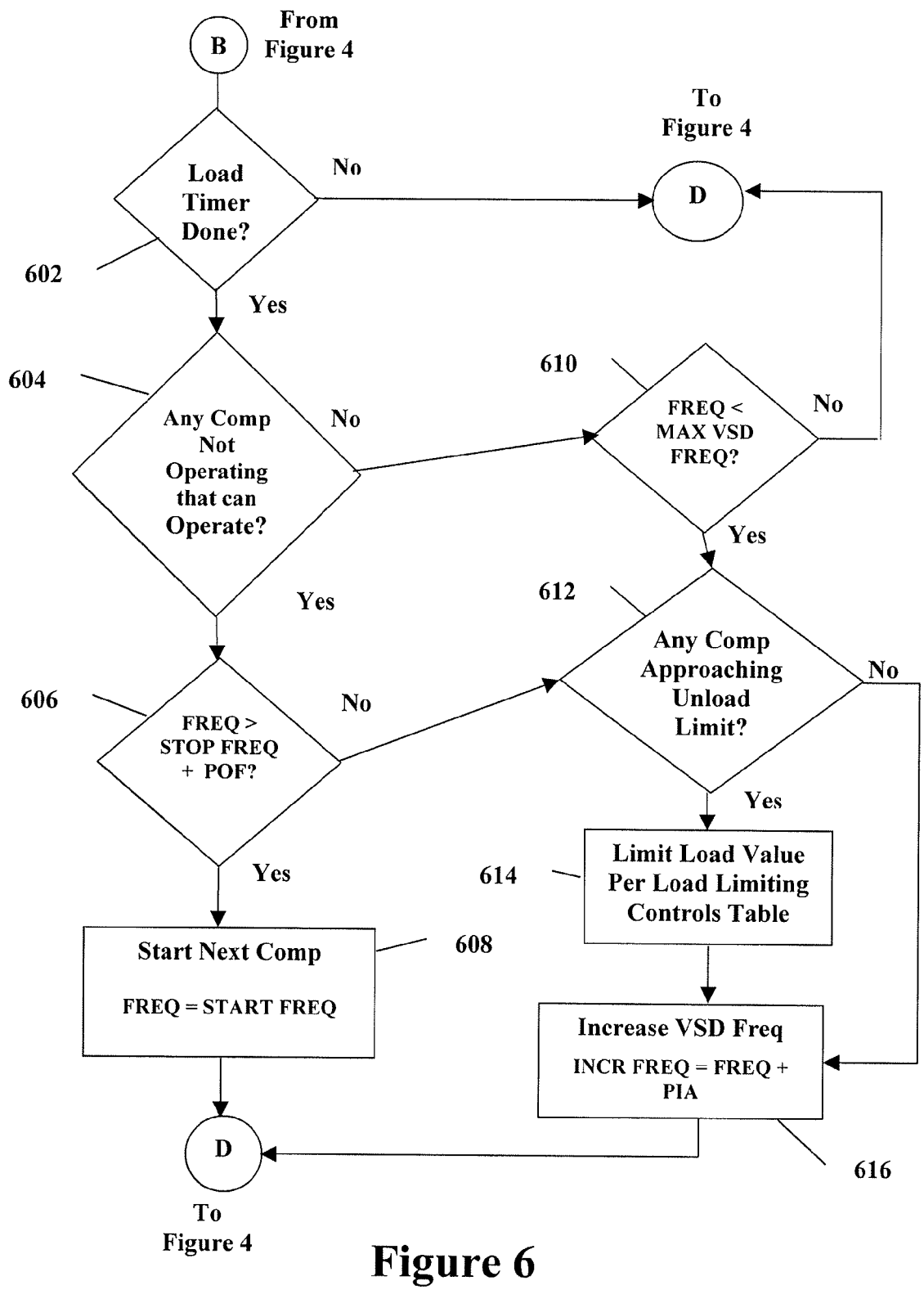
FIG. 6 is a flowchart showing a system loading control process of the present invention.

FIG. 6 illustrates a system loading control process for the present invention. The system loading control process involves either the activating or starting of one or more compressors in response to an increased load or demand on the system or the increasing of the output frequency from the VSD powering the compressors in order to increase the output capacity of the compressors in response to an increased load or demand on the system. The process begins in step 602 by determining if a load timer or counter has completed its count. In one embodiment of the present invention, the load timer is preferably set for 2 seconds. However, any suitable time duration can be used for the load timer. If the load timer has not completed its count, the system does not load any of the compressors and returns to step 402 of FIG. 4 to further monitor system conditions until the load timer is finished or system conditions change. The load timer is used to give the system adequate time to respond to a prior control instruction that started a new compressor or increased the output frequency of the VSD powering the compressors and their respective motors.

After the load timer has completed its count, the system loading control process then determines if there are any compressors that are not currently in operation that are capable of operation in step 604. If there are any compressors that are not currently in operation, then the output frequency of the VSD, i.e., the operating frequency of the compressors, is compared to a stop frequency plus a predetermined offset frequency in step 606. The stop frequency is preferably calculated as the VSD minimum frequency output, as discussed above, multiplied by the ratio of the number of operating compressors plus one divided by the number of operating compressors. The predetermined offset frequency can range from between about 0 Hz and about 50 Hz and is preferably between about 5 Hz and about 10 Hz. The comparison of the VSD output frequency to the stop frequency plus the offset frequency is used to determine if it would be appropriate to start another compressor. The addition of the offset frequency to the stop frequency is used to prevent the starting of a compressor by just satisfying the condition for starting a compressor, i.e., being at the stop frequency, and then having to shut off a compressor in response to a decreased load or demand on the system, i.e., a call to unload, because the compressors are operating at the minimum frequency. The addition of the offset to the stop frequency is used to have the compressors operating at a frequency above the minimum frequency, after an additional compressor is started, so there is room to unload the compressors by decreasing the output frequency of the VSD before a shutdown of a compressor is required.

After determining that the VSD output frequency is greater than the stop frequency plus the offset in step 606, another compressor is started and the VSD is controlled to power the operating compressors at a start frequency in step 608. The start frequency is preferably calculated as the VSD output frequency prior to starting the compressor multiplied by the ratio of the number of operating compressors (including the one to be started) minus one divided by the number of operating compressors (including the one to be started). Once the compressors are started and accelerated to the start frequency, the process returns to step 402 of FIG. 4 to further monitor system conditions.

Referring back to step 604, if all the compressors are currently operating, it is determined in step 610 if the VSD output frequency powering the compressors is less than the maximum VSD output frequency. The VSD maximum output frequency can range between 120 Hz and 300 Hz and is preferably 200 Hz. However, it is to be understood that the VSD can have any suitable maximum output frequency. If the VSD output frequency is equal to the maximum VSD output frequency, then the process returns to step 402 of FIG. 4 to further monitor system conditions because no additional capacity can be generated by the system. However, if the VSD output frequency is less than the maximum VSD output frequency, then the compressors and their corresponding refrigerant circuits are checked or evaluated to determine if they are approaching an unload limit in step 612. The unload limit is used to prevent damage to the compressors and corresponding refrigerant circuit by unloading the compressors when certain predetermined parameters or conditions are present.

If no compressors or corresponding refrigerant circuits are approaching an unload limit, then the VSD is controlled to power the compressors at an increased VSD output frequency equal to the current output frequency plus a predetermined increment amount in step 616. The predetermined increment amount can be between about 0.1 Hz and about 25 Hz and is preferably between about 0.1 Hz and about 1 Hz. The predetermined increment amount can preferably be calculated by a fuzzy logic controller or control technique, however, any suitable controller or control technique, e.g., a PID control, can be used. The increased VSD output frequency can be increased up to the maximum VSD output frequency. Once the compressors are accelerated to the increased VSD output frequency, the process returns to step 402 of FIG. 4 to further monitor system conditions. Referring back to step 612, if it is determined that one or more compressors and corresponding refrigerant circuits are approaching an unload limit, then a limited load value based on information in a load limiting controls table is calculated for those compressors and corresponding refrigerant circuits in step 614. Next, in step 616, as described in detail above, the process adjusts the VSD output frequency for the compressors, subject to any load limits from step 614, and returns to step 402 of FIG. 4 to further monitor system conditions.

Figure 7:
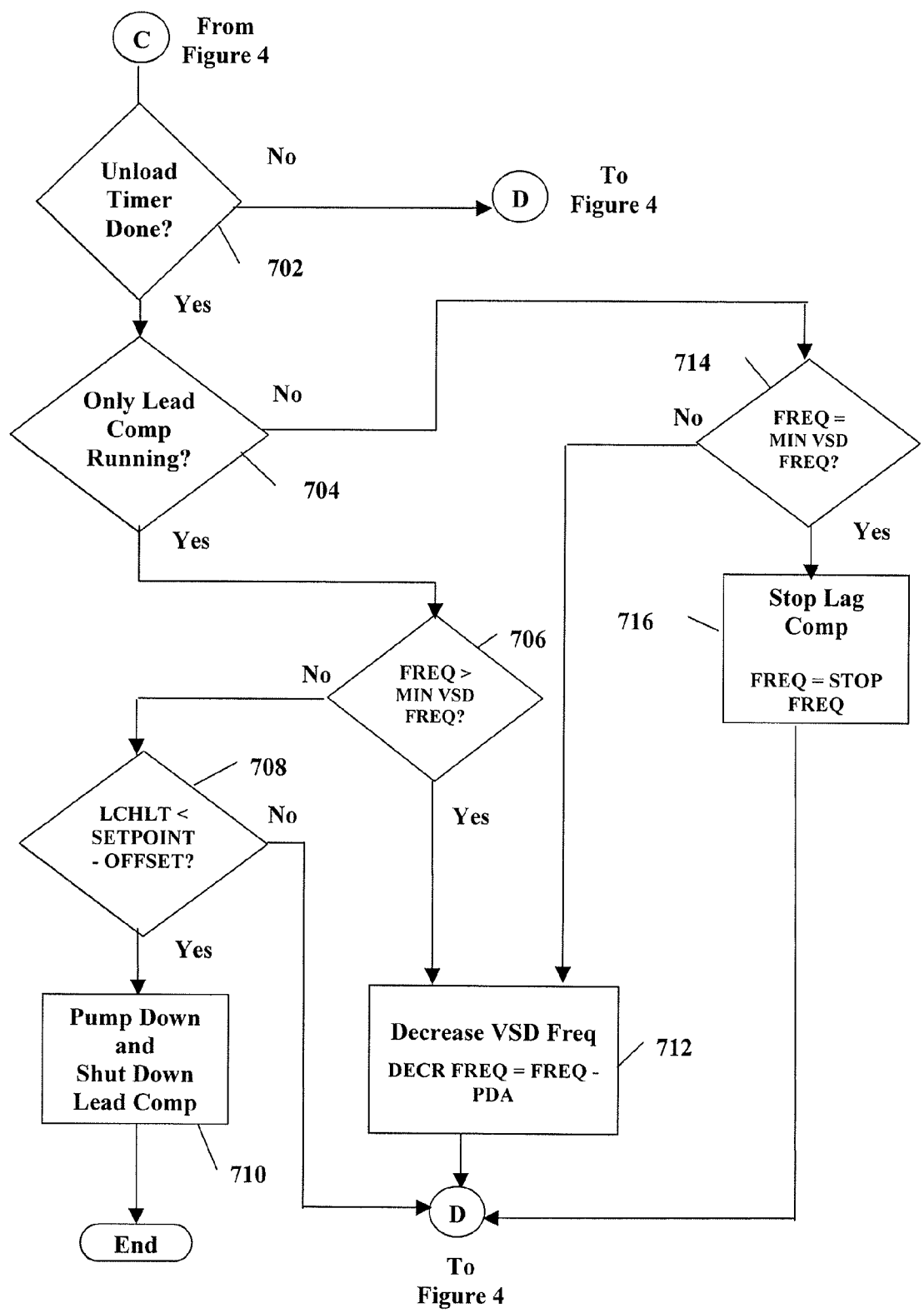
FIG. 7 is a flowchart showing a system unloading control process of the present invention.

FIG. 7 illustrates a system unloading control process for the present invention. The system unloading control process involves the deactivating or shutting down of one or more compressors in response to a reduced load or demand for the system or the decreasing of the output frequency from the VSD powering the compressors in order to decrease the output capacity of the compressors in response to a decreased load or demand on the system. The process begins in step 702 by determining if an unload timer or counter has completed its count. In one embodiment of the present invention, the unload timer is preferably set for 2 seconds. However, any suitable time duration can be used for the unload timer. If the unload timer has not completed its count, the system does not unload any of the compressors and returns to step 402 of FIG. 4 to further monitor system conditions until the unload timer is finished or system conditions change.

The unload timer is used to give the system adequate time to respond to a prior control instruction that stopped an operating compressor or decreased the output frequency of the VSD powering the compressors and their respective motors. After the unload timer has completed its count, the compressor unloading control process then determines if only a single compressor or the lead compressor is currently in operation in step 704. If only a single compressor or the lead compressor is in operation, then the output frequency of the VSD is compared to the minimum VSD frequency to determine if the output frequency of the VSD is greater than the minimum VSD frequency in step 706. If the output frequency of the VSD is not greater than the minimum VSD frequency, then the LCHLT is evaluated to determine if it is less than the setpoint temperature minus the predetermined offset in step 708. If the LCHLT is less than the setpoint temperature minus the predetermined offset in step 708, then the process begins the shut down process for the compressor and the corresponding refrigeration system in step 710 and the process ends. The compressor is shut down if the LCHLT is less than the setpoint temperature minus the predetermined offset because the system has completed its operating objective, i.e., reaching the setpoint temperature, and, depending on the freezing point of the liquid in the chiller, to possibly avoid damaging the compressor or the corresponding refrigeration circuit by having too low a LCHLT. If the LCHLT is not less than the setpoint temperature minus the predetermined offset in step 708, then the compressor continues operating at the minimum speed and the process returns to step 402 for further monitoring.

If the output frequency of the VSD is greater than the minimum VSD frequency in step 706, then the VSD is controlled to power the compressor at a decreased VSD output frequency equal to the current output frequency minus a predetermined decrement amount in step 712. The predetermined decrement amount can be between about 0.1 Hz and about 25 Hz and is preferably between about 0.1 Hz and about 1 Hz. The predetermined decrement amount can preferably be calculated by a fuzzy logic control, however, any suitable control, e.g., a PID control, can be used. The decreased VSD output frequency can be decreased down to the minimum VSD output frequency. Once the compressor is adjusted to the decreased VSD output frequency, the process returns to step 402 of FIG. 4 to further monitor system conditions.

Referring back to step 704, if any of the compressors besides the lead compressor are in operation, it is determined in step 714 if the VSD output frequency powering the compressors is equal to the minimum VSD output frequency. If the VSD output frequency is equal to the minimum VSD output frequency, then a lag compressor is stopped or shut down and the VSD is controlled to power the remaining operating compressors at the stop frequency in step 716. As discussed above, the stop frequency is preferably calculated as the VSD minimum frequency output, multiplied by the ratio of the number of operating compressors plus one divided by the number of operating compressors. Once the remaining compressors are started and accelerated to the stop frequency, the process returns to step 402 of FIG. 4 to further monitor system conditions.

If the VSD output frequency is not equal to the minimum VSD output frequency in step 714, then the VSD is controlled to power the compressors at a decreased VSD output frequency equal to the current output frequency minus a predetermined decrement amount in step 712, as described in greater detail above. Once the compressors are adjusted to the decreased VSD output frequency, the process returns to step 402 of FIG. 4 to further monitor system conditions.

While the above control process discussed the controlling of the system capacity by adjusting the output frequency of the VSD provided to the motors, it is to be understood that the output voltage of the VSD can also be adjusted to control the system capacity. In the above control processes, the VSD is preferably controlled to maintain a constant volts/Hz or constant torque mode of operation. The constant flux or constant volts/Hz mode of motor operation, which is used for a load with a substantially constant torque profile, such as a screw compressor, requires any increases or decreases in frequency provided to the motor to be matched by corresponding increases and decreases in the voltages provided to the motor. For example, a four pole induction motor can deliver twice its rated output horsepower and speed when operated at twice its rated voltage and twice its rated frequency. When in the constant flux or constant volts/Hz mode, any increase in the voltage to the motor results in an equivalent increase in the output horsepower of the motor. Similarly, any increase in the frequency to the motor results in an equivalent increase in the output speed of the motor.

When starting or stopping a compressor in order to adjust the capacity of the chiller system, such as described in steps 608 and 716, the VSD preferably follows the following procedure. First, the VSD is decelerated to a zero speed in a controlled stop. Next, the compressor to be added or removed is correspondingly enabled or disabled. The VSD is then controlled to provide output power to the compressors in operation at either the start frequency, when adding a compressor, or the stop frequency, when removing a compressor. It being understood that the VSD is also controlled to provide the appropriate voltage for the corresponding frequency. Finally, the VSD is accelerated to the appropriate frequency and voltage to power the compressors in operation.

In addition to the capacity control process described above with respect to FIGS. 4-7, the present invention can also implement a capacity control process for high ambient air temperature conditions, such as those greater than 95° F. The high ambient temperature capacity control process can be implemented as either a separate control process from the capacity control process described above or an integrated component of the capacity control process described above. The high ambient temperature capacity control process can be initiated when the outdoor ambient temperature is greater than a predetermined outdoor ambient temperature. The predetermined outdoor ambient temperature can be about 95° F. or greater and is preferably about 105° F. The high ambient temperature capacity control process can continue until the outdoor ambient temperature is less than the predetermined outdoor ambient temperature by a predetermined offset amount. Once the outdoor ambient temperature is less than the predetermined outdoor ambient temperature by the predetermined offset amount, the regular capacity control process resumes operation. The predetermined offset amount can be between about 1° F. and about 10° F., and is preferably about 5° F.

Figure 8:
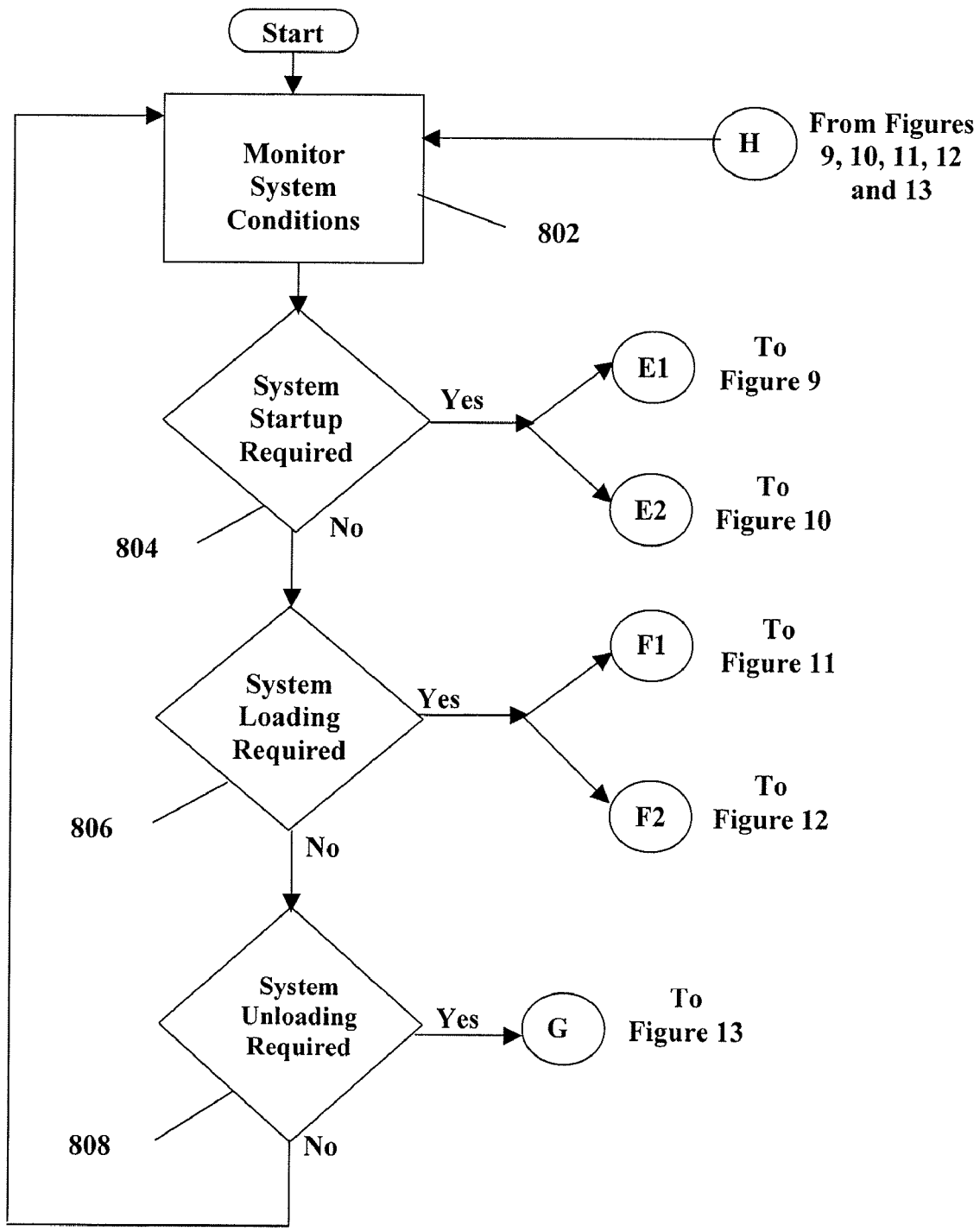
FIG. 8 is a flowchart showing the basic high ambient temperature capacity control process of the present invention.

FIG. 8 illustrates the basic high ambient temperature (HAT) capacity control process of the present invention. The process begins by monitoring the current operating conditions of the compressors and the corresponding chiller system at step 802. One or more sensors or other suitable monitoring devices are placed in the chiller system to monitor one or more operating conditions of the chiller system. The sensors provide signals to the control panel 110 corresponding to the measured system parameters. The measured system parameters of the chiller system can correspond to any suitable chiller system parameter that can be measured such as refrigerant temperature, refrigerant pressure, refrigerant flow, leaving chilled liquid temperature from the evaporator or any other suitable parameter.

Based on the monitored system conditions obtained in step 802, the HAT control process then determines if an initial system startup, or restart, is required in step 804. An initial system startup involves the starting of one or more compressors to transition the system from an inactive or shut-down state to an active or operational state. If an initial system startup is determined to be necessary, the control passes to one of several embodiments of startup control processes (see FIGS. 9 and 10) described in greater detail below. If no initial system startup is necessary, usually because one or more compressors have been previously started, the HAT control process moves to step 806 to determine if system loading or increased system capacity is required.

If the HAT control process determines that system loading is required in response to a demand for additional system capacity based the monitored system conditions in step 802, the HAT control process proceeds to one of several embodiments of system loading processes (see FIGS. 11 and 12) described in greater detail below to increase the load on the compressors in order to increase the system capacity. If system loading is not necessary, the HAT control process moves to step 808 to determine if system unloading or decreased system capacity is required.

If the HAT control process determines that system unloading is required in response to a decrease in the demand for system capacity based on the monitored system conditions in step 802, the HAT control process proceeds to a system unloading process shown in FIG. 13 and described in greater detail below to decrease the load on the compressors in order to decrease the system capacity. If system unloading is not necessary, the HAT control process returns to step 802 and repeats the process.

Figure 9:
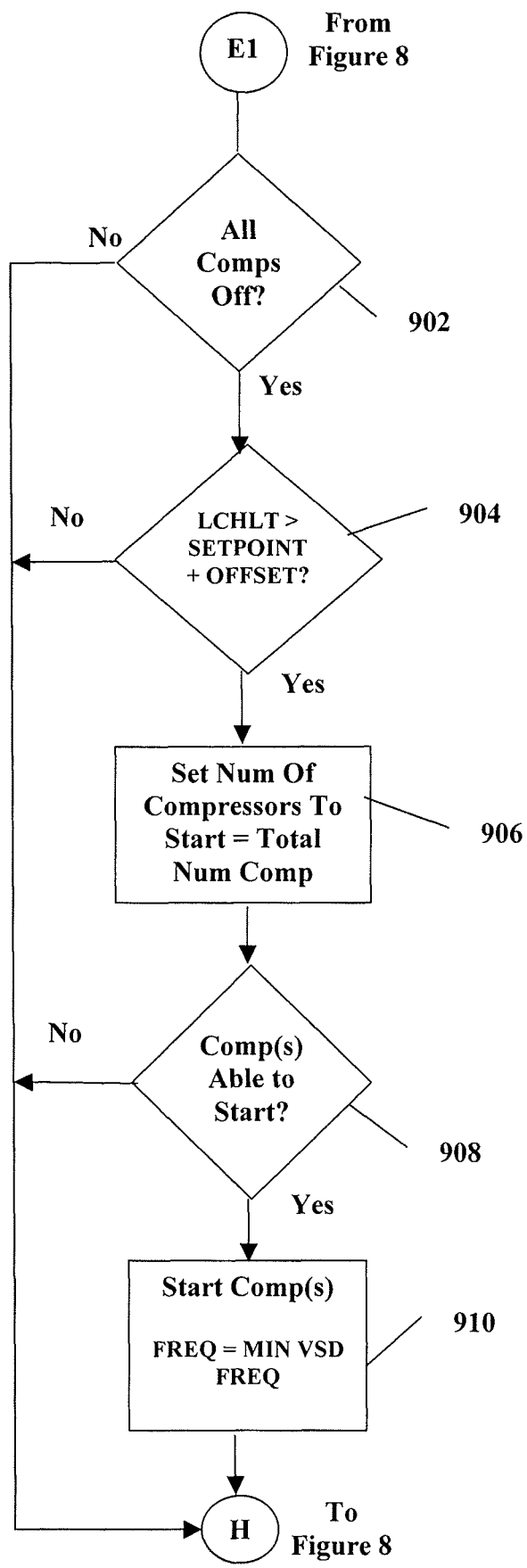
FIG. 9 is a flowchart showing a first embodiment of a compressor starting process of the high ambient temperature control process of the present invention.
Figure 10:
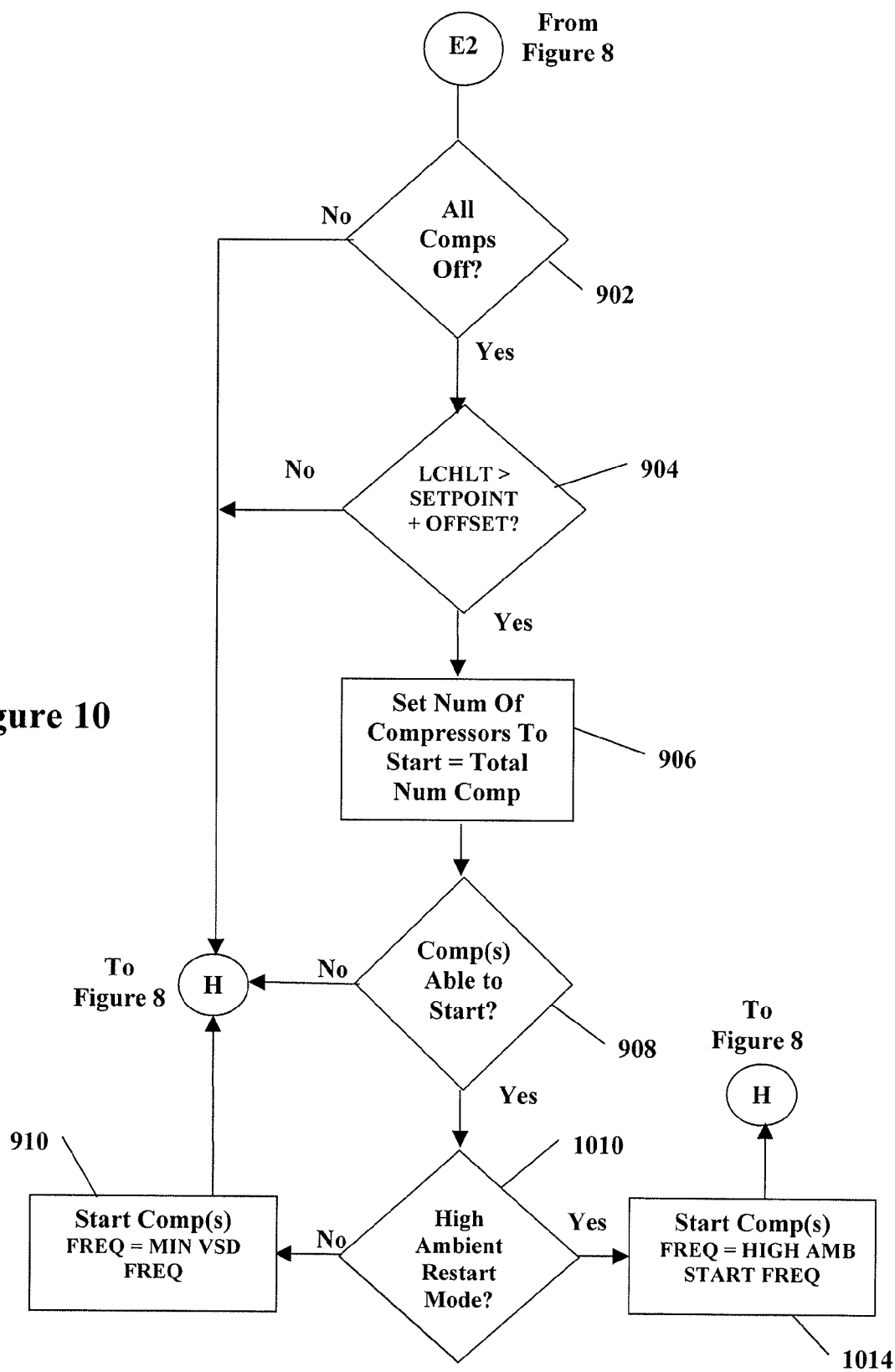
FIG. 10 is a flowchart showing a second embodiment of a compressor starting process of the high ambient temperature control process of the present invention.
Figure 11:
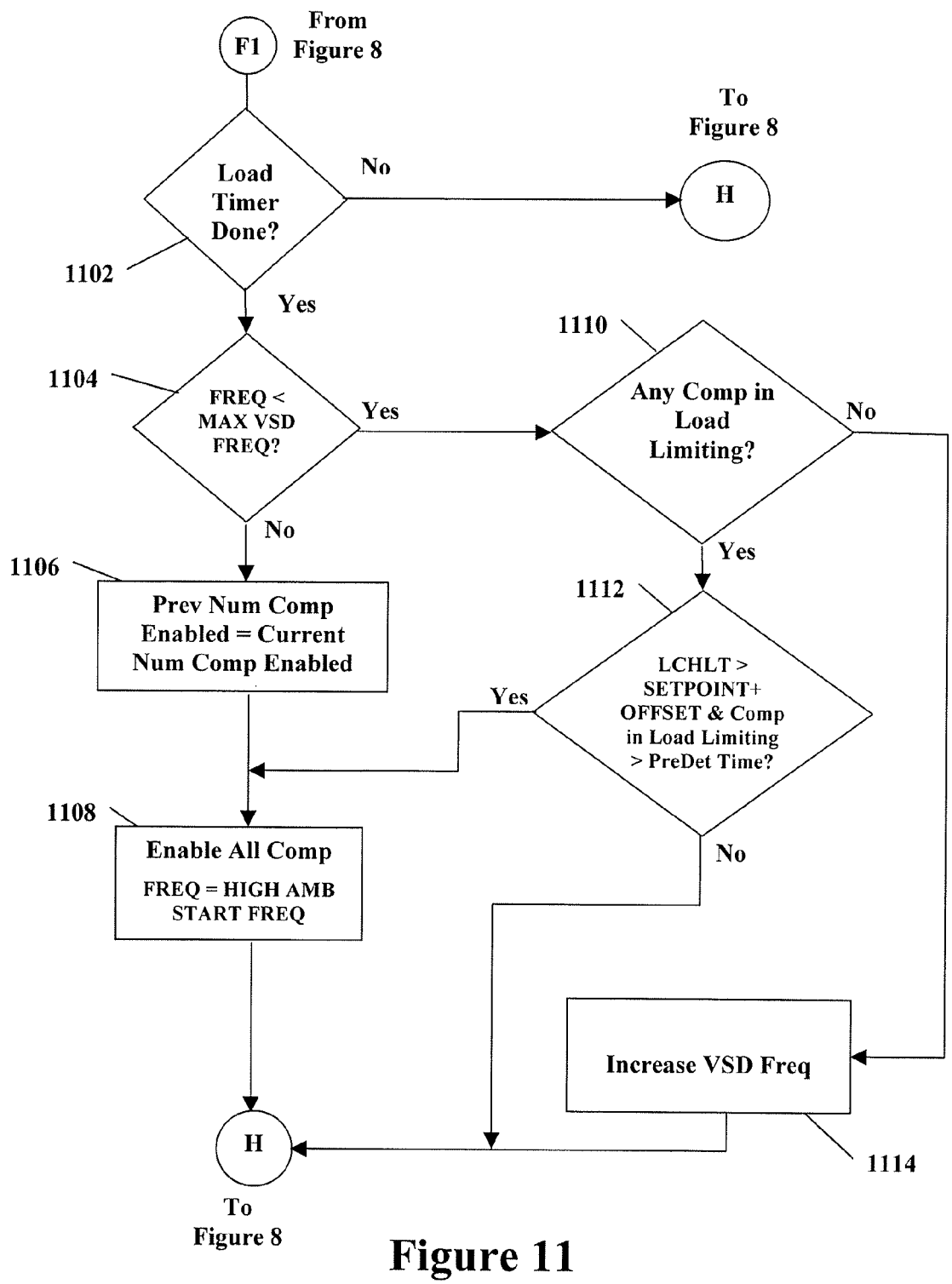
FIG. 11 is a flowchart showing a first embodiment of a system loading process of the high ambient temperature control process of the present invention.
Figure 12:
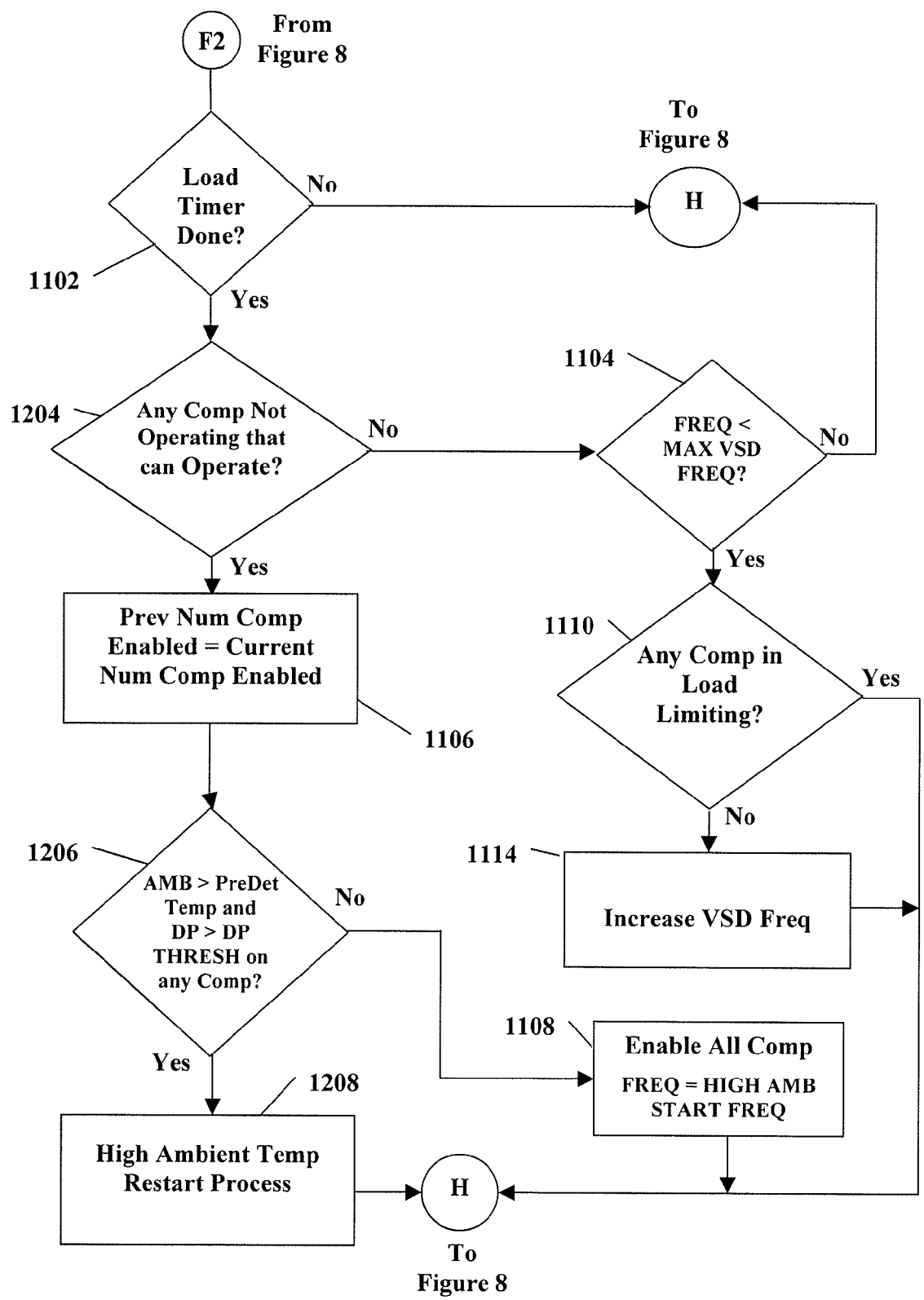
FIG. 12 is a flowchart showing a second embodiment of a system loading process of the high ambient temperature control process of the present invention.

The basic HAT control process of FIG. 8 preferably uses a fuzzy logic control technique, but can use any suitable control technique for determining when to start or restart the compressors of the chiller system, when to increase the capacity of the chiller system and when to decrease the capacity of the chiller system. In addition, while the basic HAT control process is shown FIG. 8, the specific HAT control process can be implemented in several different embodiments. The one embodiment is illustrated in FIGS. 9, 11 and 13 and the other, and more preferred, embodiment is illustrated in FIGS. 10, 12 and 13. The specific control processes of FIGS. 9, 11, and 13 and FIGS. 10, 12 and 13 are preferably directed to the control process for the chiller system in response to one of the above-determinations being made by the basic HAT control process of FIG. 8.

FIG. 9 illustrates one embodiment of a startup control process for the HAT control process of the present invention. The startup control process involves the starting of one or more compressors to transition the system from an inactive or shutdown state to an active or operational state. The process begins in step 902 by determining if all of the compressors (and the corresponding motors and inverters) are off, inactive or shutdown. If one of the compressors is active or operational in step 902, the process returns to step 802 of FIG. 8 to further monitor system conditions because the startup process is not required because one or more of the compressors is operational. Next, after determining that all the compressors are inactive or off in step 902, i.e., the compressors are not in operation, the startup control process determines if the leaving chilled liquid temperature (LCHLT) from the evaporator is greater than a setpoint temperature plus a predetermined offset or control range in step 904. The predetermined offset provides for a control region around the setpoint temperature, i.e., the desired LCHLT, to prevent frequent adjustments to the chiller system in response to very minor changes in system conditions.

The predetermined setpoint temperature and the predetermined offset can preferably be programmable or set by a user, but, it is to be understood that the predetermined setpoint temperature and the predetermined offset can also be preprogrammed into the system. The predetermined setpoint temperature can range between about 10° F. and about 60° F. depending on the particular liquid to be chilled in the evaporator. The predetermined setpoint temperature is preferably between about 40° F. and about 55° F. when water is to be chilled and is preferably between about 15° F. and about 55°

F. when a glycol mixture is to be chilled. The predetermined offset can range between about ±1° F. and about ±5° F. and is preferably between about ±1.5° F. and about ±2.5° F.

If the LCHLT is greater than the setpoint temperature plus the predetermined offset in step 904, then all of the compressors are designated for starting in step 906. All of the compressors are designated for starting during high ambient air temperature conditions to reduce compressor cycling and compressor starting procedures, both of which involve stopping any then operating compressor in the system after the system has been started and is operational. Furthermore, at high ambient temperature conditions, the chiller system has a reduced cooling capacity thereby permitting a greater number of compressors to be started without generating an excess capacity, which may occur at lower ambient temperature conditions. If the LCHLT is not greater than the setpoint temperature plus the predetermined offset in step 904, then the process returns to step 802 of FIG. 8 to further monitor system conditions. After all of the compressors are designated for starting, the compressors are tested in step 908 to determine if the compressors can be started or operated. In step 908, the control panel 110 can preferably determine if the compressors cannot be started or operated or are otherwise inoperable based on internal compressor controls or signals that prevent the starting of a compressor, (e.g., a "no run permissive" signal is present, the compressor has been faulted or the compressor is locked out), or based on other system controls or signals relating to problems or restrictions in the system, (e.g., the system switch has been turned off, the system has been faulted, the system has been locked out, or the system anti-recycle timer is active). If all the compressors cannot be started in step 908, the process returns to step 802 of FIG. 8 to further monitor system conditions.

Once it is determined that one or more of the compressors are capable of being started and operated, those compressors are started in step 910 and operated at a frequency corresponding to the minimum frequency output by the VSD. The minimum frequency output by the VSD is dependent on the outdoor ambient temperature. The VSD preferably has a first (low) minimum frequency for all ambient temperatures less than or equal to a first ambient temperature setpoint. The first ambient temperature setpoint is preferably between about 105° F. and about 115° F. The minimum frequency for the VSD then increases as the ambient temperature rises above the first ambient temperature setpoint up to a second (high) minimum frequency at a second ambient temperature setpoint. The second ambient temperature setpoint is preferably between about 120° F. and about 130° F. The minimum frequency output by the VSD for compressor operation can range from about 15 Hz to about 120 Hz and is preferably about 50 Hz for the first minimum frequency and preferably about 95 Hz for the second minimum frequency. It is to be understood that the VSD may be capable of providing a minimum frequency output that is less than the minimum frequency output required for compressor operation. In addition, in step 910, a load timer and an unload timer are both set for a predetermined startup time. The predetermined startup time can range from about 10 seconds to about 60 seconds and is preferably about 30 seconds. Additional discussion of the operation of the load and unload timers is provided below with regard to FIGS. 11-13. After the compressors are started in step 910, the process returns to step 802 of FIG. 8 to begin the process again and monitor system conditions.

FIG. 10 illustrates the preferred startup control process for the HAT control process of the present invention. The startup control process involves the starting or restarting of one or more compressors to transition the system from an inactive or shutdown state to an active or operational state. The process begins in step 902 by determining if all of the compressors are off, inactive or shutdown. If one of the compressors is active or operational in step 902, the process returns to step 802 of FIG. 8 to further monitor system conditions. Next, after determining that all the compressors are inactive or off in step 902, i.e., the compressors are not in operation, the startup control process determines if the leaving chilled liquid temperature (LCHLT) from the evaporator is greater than a setpoint temperature plus a predetermined offset or control range in step 904.

If the LCHLT is not greater than the setpoint temperature plus the predetermined offset in step 904, then the process returns to step 802 of FIG. 8 to further monitor system conditions. However, if the LCHLT is greater than the setpoint temperature plus the predetermined offset in step 904, then all of the compressors are designated for starting in step 906. After all of the compressors are designated for starting, the compressors are tested in step 908 to determine if the compressors can be started or operated. If all the compressors cannot be started in step 908, the process returns to step 802 of FIG. 8 to further monitor system conditions.

Once it is determined that one or more of the compressors are capable of being started and operated, the control proceeds to step 1010 to determine if the compressors are to be started in a high ambient restart mode or a normal starting mode. A more detailed discussion of the high ambient restart mode is provided below with regard to FIG. 12. If the compressors are not to be started in the high ambient restart mode, i.e., the compressors are to be started in the normal starting mode, the control proceeds to step 910 and the compressors are started and operated at a frequency corresponding to the minimum frequency output by the VSD, which minimum frequency is based on the outdoor ambient temperature. However, if the compressors are to be restarted in the high ambient restart mode, the control proceeds to step 1014 and the compressors are started and operated at a frequency corresponding to the high ambient starting frequency. The high ambient starting frequency is calculated as the "current" VSD frequency, i.e., the VSD frequency immediately before the high ambient restart was initiated, multiplied by the previous number of compressors enabled, i.e., the number of compressors operating immediately before the high ambient restart was initiated, and divided by the number of compressors that are being enabled or started. The calculation of the high ambient starting frequency is used to provide the same "total Hz" output of the VSD that was present prior to initiating the high ambient restart mode, while operating an additional number of compressors in the system as a result of the high ambient restart. In addition, in both steps 910 or 1014, a load timer and an unload timer are both set for the predetermined startup time. After the compressors are started in either step 910 or 1014, the process returns to step 802 of FIG. 8 to begin the process again and monitor system conditions.

FIG. 11 illustrates one embodiment of a system loading control process for the HAT control process of the present invention. The system loading control process involves either the activating or starting of one or more compressors in response to an increased load or demand on the system or the increasing of the output frequency from the VSD powering the compressors in order to increase the output capacity of the compressors in response to an increased load or demand on the system. The process begins in step 1102 by determining if a load timer or counter has completed its count. If the load timer has not completed its count, the system does not load any of the compressors and returns to step 802 of FIG. 8 to further monitor system conditions until the load timer is finished or system conditions change. The load timer is used to give the system adequate time to respond to a prior control instruction that started or stopped a compressor or increased or decreased the output frequency of the VSD powering the compressors and their respective motors.

After the load timer has completed its count, the system loading control process then determines in step 1104 if the VSD output frequency powering the compressors is less than the maximum VSD output frequency. The VSD maximum output frequency can range between 120 Hz and 300 Hz and is preferably 200 Hz. However, it is to be understood that the VSD can have any suitable maximum output frequency. If the VSD output frequency is equal to the maximum VSD output frequency, then the control process assigns the previous number of compressors enabled to be equal to the current number of compressors enabled in step 1106. Next, in step 1108, any compressor that was not currently operating is enabled and all of the compressors are set to operate at the high ambient starting frequency. Control then returns to step 802 of FIG. 8 to further monitor system conditions. In an alternate embodiment of the present invention, an additional step can be added to determine if there are any compressors that are not currently in operation that are capable of operation, which step would be similar to step 1204 in FIG. 12. As discussed above, the high ambient starting frequency is calculated as the "current" VSD frequency, i.e., the VSD frequency immediately before the starting of the remaining compressors, multiplied by the previous number of compressors enabled, i.e., the number of compressors operating immediately before the remaining compressors are started, and divided by the number of compressors that are being enabled or started.

If the VSD output frequency is less than the maximum VSD output frequency in step 1104, then the compressors and their corresponding refrigerant circuits are checked or evaluated to determine if any are operating in a load limiting mode in step 1110. The load limiting mode is used to prevent damage to the compressors and corresponding refrigerant circuit by unloading the compressors when certain predetermined parameters or conditions are present. If no compressors or corresponding refrigerant circuits are operating in the load limiting mode, then the VSD is controlled to power the compressors at an increased VSD output frequency equal to the current output frequency plus a predetermined increment amount in step 1114. The predetermined increment amount can be between about 0.1 Hz and about 25 Hz and is preferably between about 0.1 Hz and about 1 Hz. The predetermined increment amount can preferably be calculated by a fuzzy logic controller or control technique, however, any suitable controller or control technique, e.g., a PID control, can be used. The increased VSD output frequency can be increased up to the maximum VSD output frequency. In addition, in step 1114, the load timer and the unload timer are both set for a predetermined adjustment time. The predetermined adjustment time can range from about 1 seconds to about 10 seconds and is preferably about 2 seconds. Once the compressors are adjusted to their new operating VSD frequency, the process returns to step 802 of FIG. 8 to further monitor system conditions.

Referring back to step 1110, if the control process determines that one or more compressors and corresponding refrigerant circuits are operating in a load limiting mode, then the LCHLT is evaluated to determine if the LCHLT is greater than the setpoint temperature plus the predetermined offset for more than a predetermined load limiting time period in step 1112. The predetermined load limiting time period can range from about 1 minute to about 10 minutes and is preferably about 5 minutes. If the LCHLT is greater than the setpoint temperature plus the predetermined offset for the predetermined load limiting time period in step 1112, then the process proceeds to step 1108 to start any compressor that is not operating because the compressors that are operating are not able to satisfy the load and have their output restricted by operating in the load limiting mode for an extended period of time. If the LCHLT is not greater than the setpoint temperature plus the predetermined offset for the predetermined load limiting time period in step 1112, then the process returns to step 802 of FIG. 8 to further monitor system conditions and give the compressor(s) operating in the load limiting mode an opportunity to correct any problems and resume normal operation.

FIG. 12 illustrates a preferred embodiment of a system loading control process for the HAT control process of the present invention. The system loading control process involves either the activating or starting of one or more compressors in response to an increased load or demand on the system or the increasing of the output frequency from the VSD powering the compressors in order to increase the output capacity of the compressors in response to an increased load or demand on the system. The process begins in step 1102 by determining if a load timer or counter has completed its count. If the load timer has not completed its count, the system does not load any of the compressors and returns to step 802 of FIG. 8 to further monitor system conditions until the load timer is finished or system conditions change.

After the load timer has completed its count, the system loading control process then determines if there are any compressors that are not currently in operation that are capable of operation in step 1204. If there are any compressors that are not currently in operation, then the control process assigns the previous number of compressors enabled to be equal to the current number of compressors enabled in step 1106. Next, in step 1206, the ambient air temperature and discharge pressure (DP) of the compressors are evaluated to determine if the ambient air temperature is greater than a predetermined temperature and the DP is greater than predetermined DP threshold value on any compressor. The DP threshold value is calculated as the "current" VSD frequency multiplied by nine (9) and divided by twenty five (25) plus 1450. Both the VSD frequency and the DP threshold value are in ×10 format. The predetermined temperature can range from about 90° F. to about 120° F. and is preferably about 105° F.

If both the ambient air temperature is greater than the predetermined temperature and the DP is greater than the DP threshold value on any compressor in step 1206, then the process proceeds to step 1208 to initiate a high ambient temperature restart process. The high ambient temperature restart process ramps down and then deactivates all operating compressors. In addition, while the compressors are being shutdown, the DC link bus in the VSD is still being charged or active. The charging of the DC link bus enables a faster response time in restarting the compressors. Finally, a flag or other suitable notification technique is used to indicate that a high temperature restart is required in step 1010 of the startup process of FIG. 10. The process then returns to step 802 of FIG. 8 to further monitor system conditions and to begin restarting the compressors in the high ambient temperature mode. If one or both of the ambient air temperature is less than the predetermined temperature and the DP is less than the DP threshold value on any compressor in step 1206, then the process proceeds to step 1108. In step 1108, any compressor that was not currently operating is enabled and the compressors are set to operate at the high ambient starting frequency and control returns to step 802 of FIG. 8 to further monitor system conditions.

Referring back to step 1204, if all the compressors are currently operating, it is determined in step 1114 if the VSD output frequency powering the compressors is less than the maximum VSD output frequency. If the VSD output frequency is equal to the maximum VSD output frequency, then the process returns to step 802 of FIG. 8 to further monitor system conditions because no additional capacity can be generated by the system. However, if the VSD output frequency is less than the maximum VSD output frequency, then the compressors and their corresponding refrigerant circuits are checked or evaluated to determine if any compressors are operating in a load limiting mode in step 1110. If no compressors or corresponding refrigerant circuits are operating in the load limiting mode, then the VSD is controlled to power the compressors at an increased VSD output frequency equal to the current output frequency plus a predetermined increment amount in step 1114. The predetermined increment amount can be between about 0.1 Hz and about 25 Hz and is preferably between about 0.1 Hz and about 1 Hz. The predetermined increment amount can preferably be calculated by a fuzzy logic controller or control technique, however, any suitable controller or control technique, e.g., a PID control, can be used. The increased VSD output frequency can be increased up to the maximum VSD output frequency. In addition, in step 1114, the load timer and the unload timer are both set for the predetermined adjustment time. Once the compressors are adjusted to their new operating VSD frequency, the process returns to step 802 of FIG. 8 to further monitor system conditions. Referring back to step 1110, if the control process determines that one or more compressors and corresponding refrigerant circuits are operating in a load limiting mode, then the load timer and the unload timer are both set for the predetermined adjustment time and the process returns to step 802 of FIG. 8 to further monitor system conditions.

Figure 13:
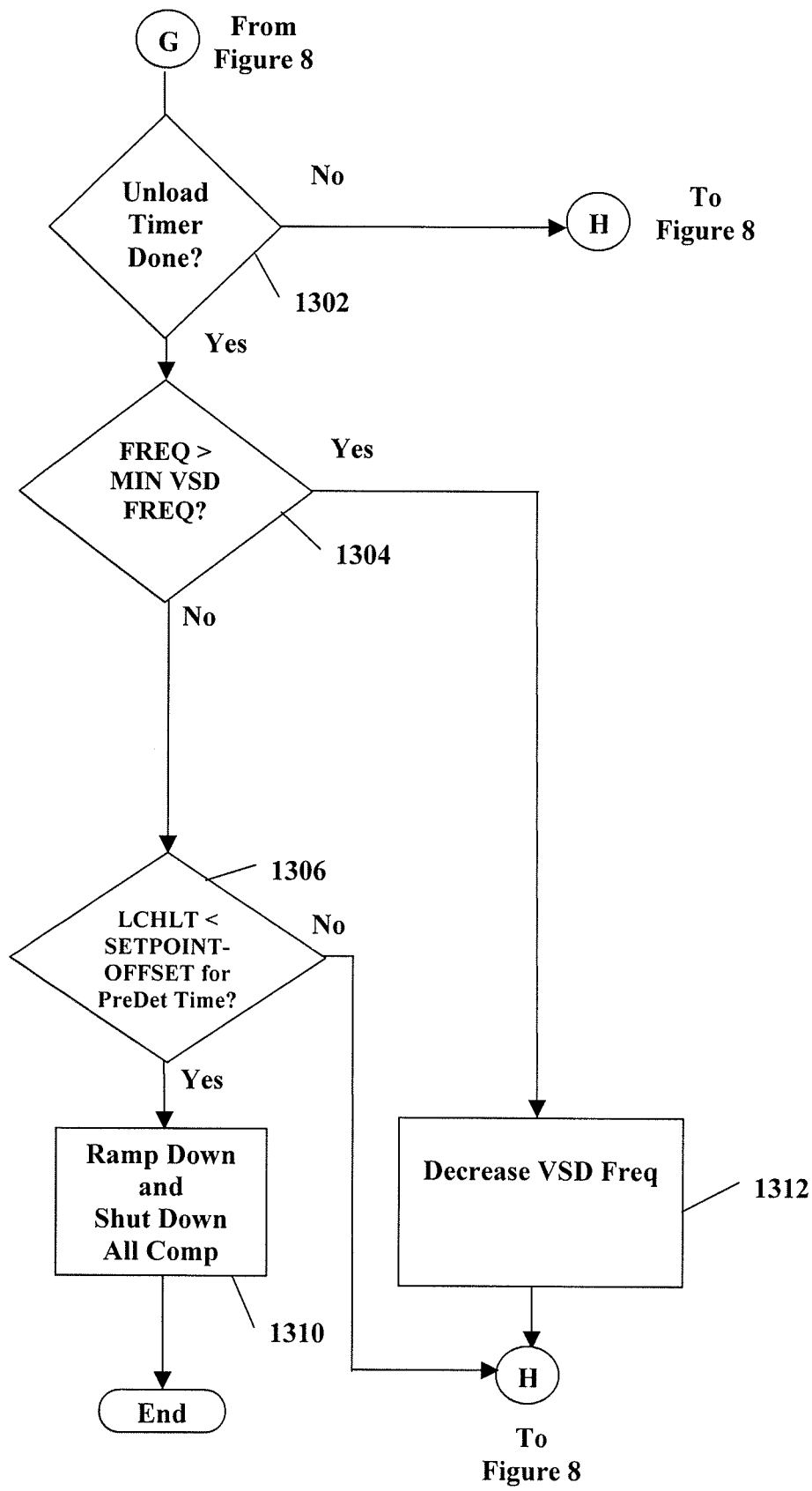
FIG. 13 is a flowchart showing an embodiment of a system unloading process of the high ambient temperature control process of the present invention.

FIG. 13 illustrates a system unloading control process for either embodiment of the HAT control process of the present invention. The system unloading control process involves the deactivating or shutting down of one or more compressors in response to a reduced load or demand for the system or the decreasing of the output frequency from the VSD powering the compressors in order to decrease the output capacity of the compressors in response to a decreased load or demand on the system. The process begins in step 1302 by determining if an unload timer or counter has completed its count. If the unload timer has not completed its count, the system does not unload any of the compressors and returns to step 802 of FIG. 8 to further monitor system conditions until the unload timer is finished or system conditions change.

The unload timer is used to give the system adequate time to respond to a prior control instruction that started or stopped a compressor or increased or decreased the output frequency of the VSD powering the compressors and their respective motors. After the unload timer has completed its count, the compressor unloading control process then determines if the output frequency of the VSD is greater than a minimum VSD frequency, which minimum frequency is dependent on the outdoor ambient temperature, in step 1304. If the output frequency of the VSD is not greater than the minimum VSD frequency, then the LCHLT is evaluated to determine if the LCHLT is less than the setpoint temperature minus the predetermined offset for more than a predetermined time period in step 1306. The predetermined time period can range from about 10 seconds to about 60 seconds and is preferably about 30 seconds. If the LCHLT is less than the setpoint temperature minus the predetermined offset for the predetermined time period in step 1306, then the process begins the shut down process for all operating compressors and the corresponding refrigeration system(s) in step 1310 and the process ends. The use of the predetermined time period in step 1306 is used to prevent the short cycling of the system and to confirm that the load is low enough to justify the entire system being shut down. The compressors are shut down if the LCHLT is less than the setpoint temperature minus the predetermined offset for the predetermined time period because the system has completed its operating objective, i.e., reaching the setpoint temperature, and, depending on the freezing point of the liquid in the chiller, to possibly avoid damaging the compressors or the corresponding refrigeration circuits by having too low a LCHLT. If the LCHLT is not less than the setpoint temperature minus the predetermined offset for the predetermined time period in step 1306, then the process returns to step 802 for further monitoring.

If the output frequency of the VSD is greater than the minimum VSD frequency in step 1304, then the VSD is controlled to power the compressors at a decreased VSD output frequency equal to the current output frequency minus a predetermined decrement amount in step 1312. The predetermined decrement amount can be between about 0.1 Hz and about 25 Hz and is preferably between about 0.1 Hz and about 1 Hz. The predetermined decrement amount can preferably be calculated by a fuzzy logic control, however, any suitable control, e.g., a PID control, can be used. The decreased VSD output frequency can be decreased down to the minimum VSD output frequency. In addition, in step 1312, the load timer and the unload timer are both set for the predetermined adjustment time. The predetermined adjustment time can range from about 1 seconds to about 10 seconds and is preferably about 2 seconds. Once the compressors are adjusted to their new operating VSD frequency, the process returns to step 802 of FIG. 8 to further monitor system conditions.

While the above control process discussed the controlling of the system capacity under high ambient temperature conditions by adjusting the output frequency of the VSD provided to the motors, it is to be understood that the output voltage of the VSD can also be adjusted to control the system capacity. In the above control processes, the VSD is preferably controlled to maintain a constant volts/Hz or constant torque mode of operation. The constant flux or constant volts/Hz mode of motor operation, which is used for a load with a substantially constant torque profile, such as a screw compressor, requires any increases or decreases in frequency provided to the motor to be matched by corresponding increases and decreases in the voltages provided to the motor. For example, a four pole induction motor can deliver twice its rated output horsepower and speed when operated at twice its rated voltage and twice its rated frequency. When in the constant flux or constant volts/Hz mode, any increase in the voltage to the motor results in an equivalent increase in the output horsepower of the motor. Similarly, any increase in the frequency to the motor results in an equivalent increase in the output speed of the motor.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for controlling the capacity of a chiller system having a plurality of compressors, the method comprising the steps of:
   providing a variable speed drive having a plurality of inverters, wherein each inverter is configured to power a corresponding motor of the plurality of compressors;
   measuring the ambient air temperature;
   controlling the variable speed drive with a capacity control program in response to the ambient air temperature being less than a first predetermined temperature; and
   controlling the variable speed drive with a high ambient air temperature capacity control program in response to the ambient air temperature being greater than a second predetermined temperature, the high ambient air temperature capacity control program being configured to override the capacity control program and provide improved control of the chiller system at high ambient air temperature conditions.

2. The method of claim 1 wherein the second predetermined temperature is greater than the first predetermined temperature by a predetermined offset temperature.

3. The method of claim 2 wherein the second predetermined temperature is equal to or greater than about 95° F. and the predetermined offset temperature is between about 1° F. and about 10° F.

4. The method of claim 1 further comprising the step of stopping the high ambient air temperature capacity control program and resuming operation with the capacity control program in response to the ambient air temperature being less than the second predetermined temperature minus a predetermined offset.

5. The method of claim 1 wherein the high ambient temperature capacity control program comprises the steps of:
   monitoring at least one operating condition of the chiller system;
   executing a system starting process in response to a determination to provide output capacity based on the at least one monitored operating condition and the plurality of compressors being in an inactive state;
   executing a system loading process in response to a determination to increase output capacity based on the at least one monitored operating condition; and
   executing a system unloading process in response to a determination to decrease output capacity based on the at least one monitored operating condition.

6. The method of claim 5 wherein the step of executing a system starting process includes:
   determining whether a chilled liquid temperature is greater than a setpoint temperature plus an offset temperature;
   designating the plurality of compressors for starting in response to a determination that the chilled liquid temperature is greater than a setpoint temperature plus an offset temperature;
   determining whether each compressor of the plurality of compressors is capable of starting; and
   starting each compressor of the plurality of compressors determined to be capable of starting.

7. The method of claim 6 wherein the step of starting each compressor of the plurality of compressors includes operating an inverter of the plurality inverters for the corresponding compressor at a predetermined frequency.

8. The method of claim 7 wherein the predetermined frequency is dependent on the ambient air temperature.

9. The method of claim 5 wherein the step of executing a system loading process includes:
   determining if an operating frequency of the plurality of inverters is less than a maximum inverter frequency; and
   increasing the operating frequency of the plurality of inverters by a predetermined frequency amount in response to a determination that the operating frequency of the plurality of inverters is less than a maximum inverter frequency.

10. The method of claim 9 wherein the step of executing a system loading process includes:
    determining whether any compressor of the plurality of compressors not currently in operation is capable of starting; and
    executing the step of determining if an operating frequency of the plurality of inverters is less than a maximum inverter frequency in response to a determination that there is no compressor not currently in operation capable of starting.

11. The method of claim 10 wherein the step of executing a system loading process includes:
    determining whether a discharge pressure on any compressor of the plurality of compressors is greater than a predetermined discharge pressure;
    determining whether the ambient air temperature is greater than a predetermined ambient temperature; and
    initiating a restart process in response to a determination that there is a compressor not currently in operation capable of starting, a determination that a discharge pressure on any compressor of the plurality of compressors is greater than a predetermined discharge pressure, and a determination that the ambient air temperature is greater than a predetermined ambient temperature.

12. The method of claim 11 wherein the step of executing a system loading process includes:
    starting all compressors not currently in operation that are capable of starting in response to a determination that a discharge pressure on any compressor of the plurality of compressors is less than a predetermined discharge pressure, or a determination that the ambient air temperature is less than a predetermined ambient temperature; and
    operating the plurality of inverters for the corresponding compressors at a predetermined frequency.

13. The method of claim 12 wherein the predetermined frequency is the operating frequency of the plurality of inverters multiplied by a ratio of a number of previously operating compressors divided by a number of compressors to be operated.

14. The method of claim 9 wherein the step of executing a system loading process includes:
    starting all compressors not currently in operation in response to a determination that the operating frequency of the plurality of inverters is not less than a maximum inverter frequency; and
    operating the plurality of inverters for the corresponding compressors at a predetermined frequency.

15. The method of claim 14 wherein the predetermined frequency is the operating frequency of the plurality of inverters multiplied by a ratio of a number of previously operating compressors divided by a number of previously operating compressors plus a number of compressors to be started.

16. The method of claim 5 wherein the step of executing a system unloading process includes determining if an operating frequency of the plurality of inverters is greater than a minimum inverter frequency.

17. The method of claim 16 wherein the step of executing a system unloading process includes decreasing the operating frequency of the plurality of inverters by a predetermined frequency amount in response to a determination that the operating frequency of the plurality of inverters is greater than a minimum inverter frequency.

18. The method of claim 16 wherein the step of executing a system unloading process includes:
   determining whether a chilled liquid temperature is less than a setpoint temperature minus an offset temperature for a predetermined time period; and
   stopping any operating inverter of the plurality of inverters in response to a determination that the operating frequency of the plurality of inverters is not greater than a minimum inverter frequency, and a determination that a chilled liquid temperature is less than a setpoint temperature minus an offset temperature for a predetermined time period.

19. The method of claim 18 wherein the minimum inverter frequency is dependent on the ambient air temperature.

20. A multiple compressor chiller system comprising:
   a plurality of compressors, each compressor of the plurality of compressors being driven by a corresponding motor, the plurality of compressors being incorporated into at least one refrigerant circuit, each refrigerant circuit comprising at least one compressor of the plurality of compressors, a condenser arrangement and an evaporator arrangement connected in a closed refrigerant loop;
   a variable speed drive to power the corresponding motors of the plurality of compressors, the variable speed drive comprising a converter stage, a DC link stage and an inverter stage, the inverter stage having a plurality of inverters each electrically connected in parallel to the DC link stage and each powering a corresponding motor of the plurality of compressors; and
   a control panel to control the variable speed drive to generate a preselected system capacity from the plurality of compressors, the control panel being configured to control the variable speed drive with a capacity control program in response to an ambient air temperature being less than a first predetermined temperature and to control the variable speed drive with a high ambient air temperature capacity control program in response to the ambient air temperature being greater than a second predetermined temperature, the high ambient air temperature capacity control program being configured to provide improved control of the chiller system at high ambient air temperature conditions.

21. The multiple compressor chiller system of claim 20 wherein the second predetermined temperature is greater than the first predetermined temperature by a predetermined offset temperature.

22. The multiple compressor chiller system of claim 21 wherein the second predetermined temperature is equal to or greater than about 95° F. and the predetermined offset temperature is between about 1° F. and about 10° F.

23. The multiple compressor chiller system of claim 20 further comprising:
   means for monitoring at least one operating condition of the chiller system; and
   the high ambient air temperature capacity control program comprises:
      means for determining capacity adjustments in the plurality of compressors based on the at least one monitored operating condition;
      a system starting process to start the plurality of compressors, the system starting process being executed in response to a determination to increase output capacity;
      a system loading process to increase output capacity of the plurality of compressors, the system loading process being executed in response to a determination to increase output capacity; and
      a system unloading process to decrease output capacity of the plurality of compressors, the system unloading process being executed in response to a determination to decrease output capacity.

24. The multiple compressor chiller system of claim 23 wherein the system starting process includes a predetermined starting frequency for the plurality of inverters, the predetermined starting frequency being based on the ambient air temperature.

25. The multiple compressor chiller system of claim 23 wherein the system loading process includes a restart process to restart the plurality of compressors, the restart process being executed in response to a determination that there is a compressor not currently in operation capable of starting, a determination that a discharge pressure on any compressor of the plurality of compressors is greater than a predetermined discharge pressure, and a determination that the ambient air temperature is greater than a predetermined ambient temperature.

26. The multiple compressor chiller system of claim 23 wherein the system unloading process includes a shut down process to stop the plurality compressors, the shut down process being executed in response to a determination that the operating frequency of the plurality of inverters is not greater than a minimum inverter frequency, and a determination that a chilled liquid temperature is less than a setpoint temperature minus an offset temperature for a predetermined time period.

27. The multiple compressor chiller system of claim 20 wherein the plurality of inverters have a minimum operating frequency, the minimum operating frequency being based on the ambient air temperature.

* * * * *